US007825947B2

(12) United States Patent
Kimura

(10) Patent No.: US 7,825,947 B2
(45) Date of Patent: Nov. 2, 2010

(54) OPTICAL SCANNING DEVICE AND IMAGE FORMING APPARATUS USING THE SAME

(75) Inventor: Kazumi Kimura, Toda (JP)

(73) Assignee: Canon Kabushiki Kaisha, Tokyo (JP)

( * ) Notice: Subject to any disclaimer, the term of this patent is extended or adjusted under 35 U.S.C. 154(b) by 49 days.

(21) Appl. No.: 12/251,158

(22) Filed: Oct. 14, 2008

(65) Prior Publication Data

US 2009/0096856 A1    Apr. 16, 2009

(30) Foreign Application Priority Data

Oct. 16, 2007   (JP)   ............................. 2007-268779

(51) Int. Cl.
*B41J 15/14*   (2006.01)
*B41J 27/00*   (2006.01)
(52) U.S. Cl. ........................ 347/243; 347/259
(58) Field of Classification Search ............. 347/230, 347/231, 241–244, 256–261
See application file for complete search history.

(56) References Cited

U.S. PATENT DOCUMENTS

| 4,809,042 | A | * | 2/1989 | Homma | 347/137 |
| 5,227,811 | A | * | 7/1993 | Kohsaka | 347/257 |
| 5,299,051 | A | * | 3/1994 | Hirano | 359/216.1 |
| 5,477,373 | A | | 12/1995 | Nakamura et al. | 359/212 |
| 5,684,618 | A | | 11/1997 | Atsuumi | 359/208 |
| 5,966,232 | A | | 10/1999 | Kimura et al. | 359/205 |
| 6,046,835 | A | | 4/2000 | Yamawaki et al. | 359/205 |
| 6,108,115 | A | | 8/2000 | Kimura et al. | 359/205 |
| 6,366,385 | B2 | | 4/2002 | Kimura | 359/204 |
| 6,570,696 | B2 | * | 5/2003 | Ori | 359/207.6 |
| 6,639,704 | B2 | | 10/2003 | Kimura | 359/205 |
| 6,677,972 | B2 | | 1/2004 | Kimura | 347/244 |
| 6,801,239 | B2 | | 10/2004 | Nakahata | 347/243 |
| 6,885,486 | B2 | | 4/2005 | Kimura | 359/205 |
| 6,927,917 | B2 | | 8/2005 | Kimura | 359/619 |

(Continued)

FOREIGN PATENT DOCUMENTS

JP    7-287180    10/1995

(Continued)

OTHER PUBLICATIONS

European Search report dated Feb. 25, 2010, from corresponding European Application No. 08018089.6.

*Primary Examiner*—Hai C Pham
(74) *Attorney, Agent, or Firm*—Fitzpatrick, Cella, Harper & Scinto

(57) ABSTRACT

An optical scanning device in which an optical deflector scanningly deflects a light beam emitted from a light source and in which an imaging optical system images the scanningly deflected light beam onto a scan surface. The imaging optical system includes a transmission type imaging optical element and a reflection type optical element, which are disposed in this order from the optical deflector. The reflection type optical element reflects the scanningly deflected light beam in an off-normal light path towards the scan surface. To avoid interference with the off-normal path, a contour central line of the transmission type imaging optical element is positioned at one side of a principal ray of the light beam incident on the transmission type imaging optical element, which side is remote from the off-normal light path reflected by the reflection type optical element.

14 Claims, 11 Drawing Sheets

U.S. PATENT DOCUMENTS

| | | | |
|---|---|---|---|
| 6,958,764 B2 | 10/2005 | Kimura | 347/244 |
| 7,015,940 B1 | 3/2006 | Kimura | 347/250 |
| 7,019,766 B2 * | 3/2006 | Itabashi | 347/243 |
| 7,039,257 B2 | 5/2006 | Kimura | 382/321 |
| 7,193,762 B1 | 3/2007 | Kimura | 359/216 |
| 7,242,420 B2 | 7/2007 | Seto et al. | 347/263 |
| 7,355,771 B2 | 4/2008 | Tomita et al. | 359/205 |
| 7,365,764 B2 | 4/2008 | Kimura | 347/250 |

FOREIGN PATENT DOCUMENTS

| | | |
|---|---|---|
| JP | 2000-231074 | 8/2000 |
| JP | 2004-21133 | 1/2004 |
| JP | 2004-317790 | 11/2004 |
| JP | 2005-338573 | 12/2005 |

* cited by examiner

OPTICAL SCANNING DEVICE AND IMAGE FORMING APPARATUS USING THE SAME

FIELD OF THE INVENTION AND RELATED ART

This invention relates to an optical scanning device and an image forming apparatus using the same. The present invention is particularly suitably usable in an image forming apparatus such as a laser beam printer (LBP), a digital copying machine or a multifunction printer, for example, having an electrophotographic process.

Conventionally, various proposals have been made in regard to color image forming apparatuses which include a plurality of optical scanning devices each having light source means, deflecting means and an imaging optical system and in which light beams the plurality of optical scanning devices are directed onto a plurality of image bearing members corresponding to these beams, respectively, to thereby produce a color image.

Referring now to FIG. 12-FIG. 14, a main structure and an optical function of a color image forming apparatus, as a comparative example, will be explained.

The color image forming apparatus shown in FIG. 12 comprises independent image bearing members (hereinafter "photosensitive drums") 20 corresponding to the colors of yellow, magenta, cyan and black. Each photosensitive drum 20 is comprised of an electric conductive member having a photosensitive layer applied thereto. An electrostatic latent image is formed thereon by a light beam (laser beam) from an optical scanning device.

In FIG. 12, denoted at 21 is an optical scanning device (scanning optical device) for projecting a light beam based on imagewise information having been applied thereto from an image reading apparatus or a personal computer.

Denoted at 22 is a developing device for forming a toner image on the photosensitive drum with triboelectrically charged toner particles, and denoted at 23 is an intermediate transfer belt for conveying the toner image on the photosensitive drum to a transfer paper sheet.

Denoted at 24 is a paper cassette for storing paper sheets on which toner images are to be produced, and denoted at 25 is a fuser fixing device for fusing on the paper sheet the toner image transferred to the paper sheet by heat.

Denoted at 26 is a paper stacking tray on which the transfer paper sheet having a toner image fixed thereon is loaded. Denoted at 27 is a cleaning device for cleaning any toner particles remaining on the photosensitive drum.

In FIG. 12, with regard to the image formation, a light beam irradiated by laser emission based on the imagewise information from the optical scanning device is projected on the photosensitive drum, by which an electrostatic latent image is formed on the photosensitive drum which is being charged with electricity by means of a charging device.

Afterwards, toner particles being triboelectrically charged within the developing device 22 are adhered to the electrostatic latent image, whereby a toner image is formed on the photosensitive drum.

The toner image is then transferred from the photosensitive drum onto the intermediate transfer belt, and subsequently it is transferred again onto a paper sheet conveyed from the paper cassette mounted at the bottom of the main assembly, by which an image is formed on the paper sheet.

The toner of the image thus transferred onto the paper sheet is fixed by the fixing device 25, and the paper sheet is discharged onto the stacking tray 26.

FIG. 13 is a sub-scan sectional view which illustrates the image forming station of FIG. 12. In FIG. 13, the image forming station is comprised of two optical scanning devices SR and SL. Since these two optical scanning devices SR and SL have a laterally symmetric structure with respect to an optical deflector 28, reference numerals are assigned to only one (optical scanning device SR) of them and description will be made to only the one.

The optical scanning device in the diagram comprises a rotary polygonal mirror 28 (hereinafter, also "polygon mirror") for scanningly deflect a light beam (laser beam) emitted based on the imagewise information, and two f-θ lenses 29 and 30 for performing constant-speed scan of the light beam and imaging the same into a spot-like shape on the photosensitive drum.

Then, the light beam passed through the f-θ lenses 29 and 30 advances via a plurality of reflecting mirrors 31a-31d for reflecting light toward a predetermined direction and passes through dustproof glass 32 for protecting the optical scanning device from dust.

Then, an electrostatic latent image is formed on the photosensitive drum surface by the light beam passed through the dustproof glass 32.

In this type of optical scanning devices, in the trend toward smallness in size of the image forming apparatus, a method of scanning and exposing four photosensitive drums with the use of one polygon motor unit such as shown in FIG. 13 has been adopted.

This method uses two optical scanning devices SR and SL for projecting a plurality of light beams toward opposed surfaces of the polygon mirror 28, respectively.

Each optical scanning device SR or SL projects two light beams, mutually shifted in parallel by a predetermined distance in the vertical direction, upon the deflecting surface (reflection surface) of the polygon mirror 28 to carry out the deflective scan.

There are two pieces of f-θ lenses 29 and 30 provided to image these light beams of the upper and lower light paths, upon the photosensitive drums, respectively.

Each of these two f-θ lens 29 and 30 has the same lens surface at two vertical levels, that is, at the upper and lower surface portions thereof. Such f-θ lens can be made by cementing two lens pieces, or it can be made by integral molding as a molded lens.

In the optical scanning device having two vertical levels such as described above, it is necessary to use a deflecting surface for scanningly deflecting light beams to the upper and lower light paths, respectively. Thus, a large-thickness polygon mirror or a polygon mirror having two-level structure has been used.

In such structure, the load of the motor which drives a large-size polygon mirror has to be large.

In contrast thereto, a color image forming apparatus in which the polygon mirror has a thinner thickness is illustrated in FIG. 14.

In FIG. 14, the image forming station is comprised of two optical scanning devices SR and SL. Since these two optical scanning devices SR and SL have a laterally symmetric structure with respect to an optical deflector 33, reference numerals are assigned to only one (optical scanning device SR) of them and description will be made to only the one.

In this case, a polygon mirror 33 is made thinner by making light beams incident on a deflecting surface 33a of the polygon mirror 33, at different angles (oblique incidence) in the sub-scan section (oblique incidence optical system).

After being scanningly deflected by the polygon mirror 33, the light beams go through two common f-θ lenses 35 and 36.

Then, one (U) of the light beams passed through the f-θ lenses 35 and 36 is directed to a photosensitive drum 38a via two reflecting mirrors 34a and 34c and one piece of concave mirror 34b.

Furthermore, the other (L) of the light beams passing through the f-θ lenses 35 and 36 is directed to a photosensitive drum 38b via two reflecting mirrors 34d and 34f and one piece of concave mirror 34e.

In the drawing, the separation of the light paths of the light beams is carried out by use of a reflecting mirror 34d which is disposed in the middle of the light path.

More specifically, the light beam L which deflectively scans the lower part in the drawing is reflected by the reflecting mirror 34d upwardly in the drawing so that it intersects with the light beam U which deflectively scans the upper part in the drawing. Then, the light beam L is directed to the photosensitive drum 38b by means of a plurality of reflecting mirrors 34c and 34f which are disposed in the upper portion of an optics box.

In FIG. 14, as described above, a plurality of reflecting mirrors are used to direct a plurality of light beams to corresponding photosensitive drum surfaces (see Patent Document Nos. 1-5 below).

[Patent Document No. 1]

Japanese Laid-Open Patent Application No. 2004-21133

[Patent Document No. 2]

Japanese Laid-Open Patent Application No. 2000-231074

[Patent Document No. 3]

Japanese Laid-Open Patent Application No. 2005-338573

[Patent Document No. 4]

Japanese Laid-Open Patent Application No. 7-287180

[Patent Document No. 5]

Japanese Laid-Open Patent Application No. 2004-317790

The color image forming apparatus having been described above as a comparative example involves various problems to be mentioned below.

The first problem is that it needs a great many reflecting mirrors to lead the light beam to the photosensitive drum.

For example, in FIG. 13, three pieces of reflecting mirror 31b, 31c and 31d are used in all over the same light path.

Furthermore, in FIG. 14 as well, it uses three pieces of reflecting mirror 34a, 34b and 34c (34d, 34e and 34f) in all over the same light path.

This results in complexity of the device due to the increased component number of items and also it leads to the necessity of the space for accommodating the mirrors. It causes enlargement in size of the overall system.

In contrast to this, Patent Document No. 1 proposes a method of reducing the height of the optical scanning device in the sub-scan direction and also for reducing the number of pieces of the reflecting mirrors.

In this approach, the light paths are designed specifically and, while taking into consideration of the size of imaging lens, the light paths are extended so as to avoid the imaging lens.

Furthermore, Patent Document No. 3 proposes a method of reducing the height of the optical scanning device in the sub-scan direction.

In this Patent Document No. 3, reduction of the height of the device is attempted while taking into account the reflection angle of the reflecting mirror, the distance from the imaging lens to the reflecting mirror, and the height of the imaging lens. Particularly, it is stated that, by limiting the height of the imaging lens with to 6-10 mm, the reflection angle of the light path can be lowered.

However, if the height of the imaging lens is lowered in a case of a lens made of a resin (hereinafter, also "resin lens") which has been used generally for the imaging lens, the following problems will be raised.

In a resin lens molded by using a mold, if the lens height is lowered with respect to the thickness of the lens optical axis direction, during the cooling process just after the lens is disengaged from the mold, cooling occurs and progresses from the upper and lower portions of the lens.

As a result of this, a refractive index distribution and a birefringence distribution are easily created inside the lens, within the sub-scan section (lens height direction).

As a result of this, the imaging performance in the sub-scan direction will increase remarkably. It can be said therefore that it is practically difficult to reduce the lens height as proposed in Patent Document No. 3.

Furthermore, in an oblique incidence optical system such as shown in FIG. 14, there is another problem that, due to oblique incidence of a light beam on an f-θ lens (imaging lens) in the sub-scan section, the aberration is deteriorated and the spot imaging performance is degraded. Furthermore, the scanning line on the scan surface is curved.

In contrast to this, in Patent Document No. 5, as shown in FIG. 10 which illustrates a third embodiment, the power allocation of the f-θ lens of two-piece structures, in the sub-scan direction, is concentrated to the second f-θ lens, and also the second f-θ lens is shifted in the sub-scan section relative to the light beam.

With this arrangement, reduction of the deterioration of aberration and reduction of the quantity of scan line curve are realized.

With regard to the light path setting, as shown in FIG. 13 of the bulletin, the light path is extended to surround the lens.

In Patent Document No. 4, like Patent Document No. 5, a portion of the f-θ lens is shifted relative to the light beam, in the sub-scan section.

These structures are adopted to avoid the surface reflection ghost of the imaging lens, and there is an assumption that all the imaging lenses to be shifted have a curvature in the sub-scan direction as well as a power.

Patent No. 4 does not fully discuss the approach for reduction in size of the overall system.

Patent Document No. 2 discloses an example wherein an imaging lens is tilted by around 1 to 4 degrees to prevent the ghost, and an example wherein, after directing a scanning light beam through an imaging lens twice, the light beam is obliquely incident within the sub-scan section to separate the light path.

Then, like Patent Document No. 5, definition of the reflection angle of a cylinder mirror is attempted to reduce the deterioration of the spot imaging performance and scan line curve due to the oblique incidence.

However, Patent Document 2 does not fully discuss the light path extension for reduction in size of the overall system.

SUMMARY OF THE INVENTION

The present invention provides a compact optical scanning device by which the light path extension is facilitated and the height of the device in the sub-scan direction can be reduced, as well as an image forming apparatus using such optical scanning device.

In accordance with an aspect of the present invention, there is provided an optical scanning device, comprising: an optical deflector configured to scanningly deflect a light beam emitted from light source means; and an imaging optical system configured to image the light beam scanningly deflected by a deflecting surface of said optical deflector, upon a scan surface; wherein the light beam incident on the deflecting surface of said optical deflector is incident perpendicularly on the deflecting surface, in a sub-scan section, wherein the light beam incident on the deflecting surface of said optical deflector is incident with an angle with respect to an optical axis of said imaging optical system, in a main-scan section, wherein, along a light path between said optical deflector and the scan surface, there are a transmission type imaging optical element constituting said imaging optical system and a reflection type optical element, which are disposed in this order from said optical deflector, wherein, when in the sub-scan section the angle defined between a principal ray of a light beam reflected by said reflection type optical element and a normal to said reflection type optical element is denoted by θ, a condition θ≦45 degrees is satisfied, and wherein, in the sub-scan section, said transmission type imaging optical element is disposed so that, to avoid interference with a light path reflected by said reflection type optical element, a contour central line of said transmission type imaging optical element is positioned at one side of a principal ray of the light beam incident on said transmission type imaging optical element which side is remote from the light path reflected by said reflection type optical element.

When in the sub-scan section the angle defined between the principal ray of the light beam reflected by said reflection type optical element and the normal to said reflection type optical element is denoted by θ, a condition θ≦30 degrees may be satisfied.

When the power of said transmission type imaging optical element in the sub-scan section is denoted by $\phi_i$, and the power of said imaging optical system in the sub-scan section is denoted by $\phi_{all}$, a condition $|\phi_i/\phi_{all}| \leq 0.01$ may be satisfied.

When the curvature radius in the sub-scan direction of a light entrance surface of said transmission type imaging optical element is denoted by R1 (mm) and the curvature radius in the sub-scan direction of a light exit surface of said transmission type imaging optical element is denoted by R2 (mm), a condition |1/R1|+|1/R2|<0.0067 (1/mm) may be satisfied.

In the sub-scan section, the optical axis of said transmission type imaging optical element may not coincide with a contour central line of said transmission type imaging optical element, and in the sub-scan section, the principal ray of the light beam incident on said transmission type imaging optical element may pass through the optical axis of said transmission type imaging optical element.

The transmission type imaging optical element may be made of a resin material.

When in the sub-scan section the height of the outer configuration of a holding frame holding said transmission type imaging optical element is denoted by H (mm) and a physical distance from said contour central line to the principal ray of the light beam incident on the light entrance surface of said transmission type imaging optical element is denoted by dZ (mm), a condition 0.05<dZ/H<0.5 may be satisfied.

The transmission type imaging optical element may have a reference surface for the positioning inside the main-scan section, which reference surface may be disposed outside an effective region of an optical surface of said transmission type imaging optical element.

The transmission type imaging optical element may have a reference protrusion for determining a reference position in the main-scan section, which protrusion may be provided at the light entrance surface side of said transmission type imaging optical element.

In the sub-scan section, said transmission type imaging optical element may have a reference member of concave shape for determining a reference position in the main-scan section, which reference member may be provided at an outer circumferential portion of said transmission type imaging optical element in the sub-scan direction.

In the sub-scan section, an end face at an outer circumferential portion of a holding frame in the sub-scan direction for holding said transmission type imaging optical element may have a tapered shape along a light path reflected by said reflection type optical element.

In accordance with anther aspect of the present invention, there is provided an optical scanning device, comprising: two imaging optical systems as recited above and disposed in the sub-scan section to sandwich said optical deflector.

In accordance with a further aspect of the present invention, there is provided an image forming apparatus, comprising: an optical scanning device as recited above; a photosensitive member disposed at said scan surface; a developing device configured to develop an electrostatic latent image formed on said photosensitive member by a light beam scanned by said optical scanning device, into a toner image; a transfer device configured to transfer the developed toner image onto a transfer material; and a fixing device configured to fix the transferred toner image on the transfer material.

In accordance with a yet further aspect of the present invention, there is provided an image forming apparatus, comprising: an optical scanning device as recited above; and a printer controller configured to convert coded data inputted thereinto from an external instrument, into an imagewise signal and to input the imagewise signal into said optical scanning device.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

In the present invention, the term "optical path length" refers to the optical distance from the deflection point of an optical deflector to a surface to be scanned (scan surface).

Here, it should be noted that, in the present invention, the words "optical distance" mean "the distance through which a light beam advances in a state as the light path is developed".

Also, it should be noted that, in the present invention, the words "physical distance" means the length of a straight line connecting the scan surface 11 and the optical deflector 5.

Preferred embodiments of the present invention will now be described with reference to the attached drawings.

Embodiment 1

Figure 1:
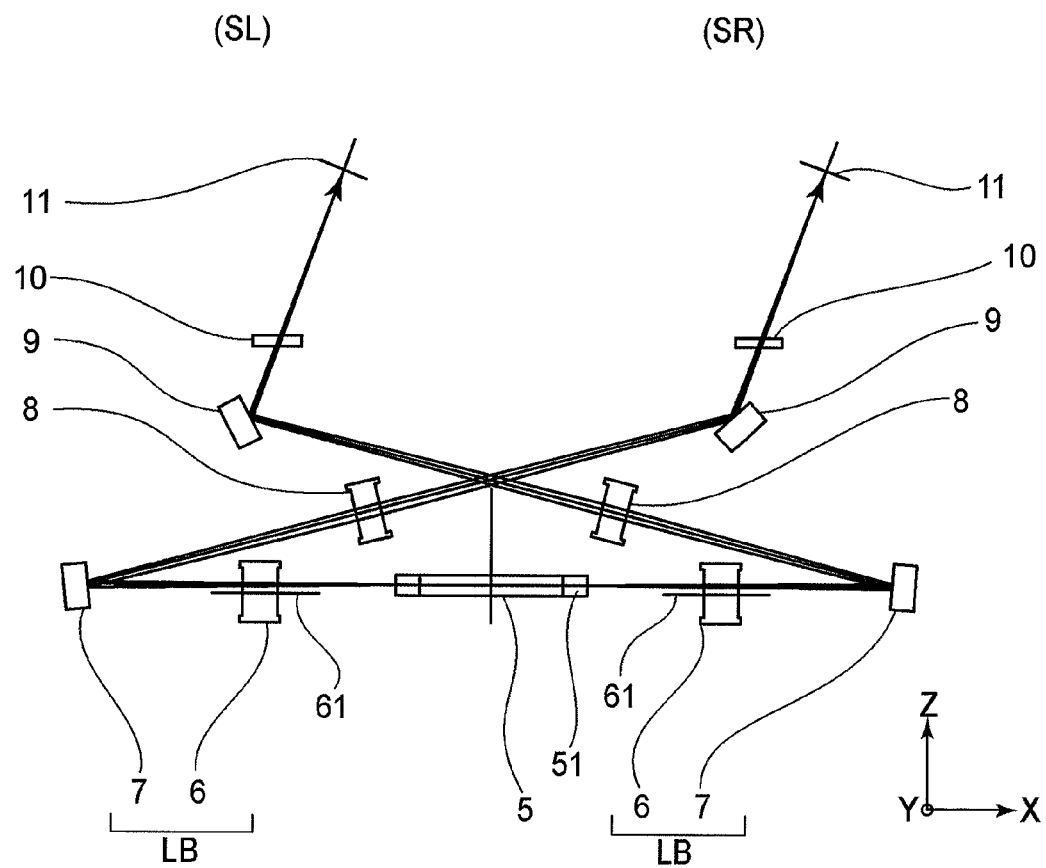
FIG. 1 is a sub-scan sectional view of a first embodiment of the present invention.
Figure 2:
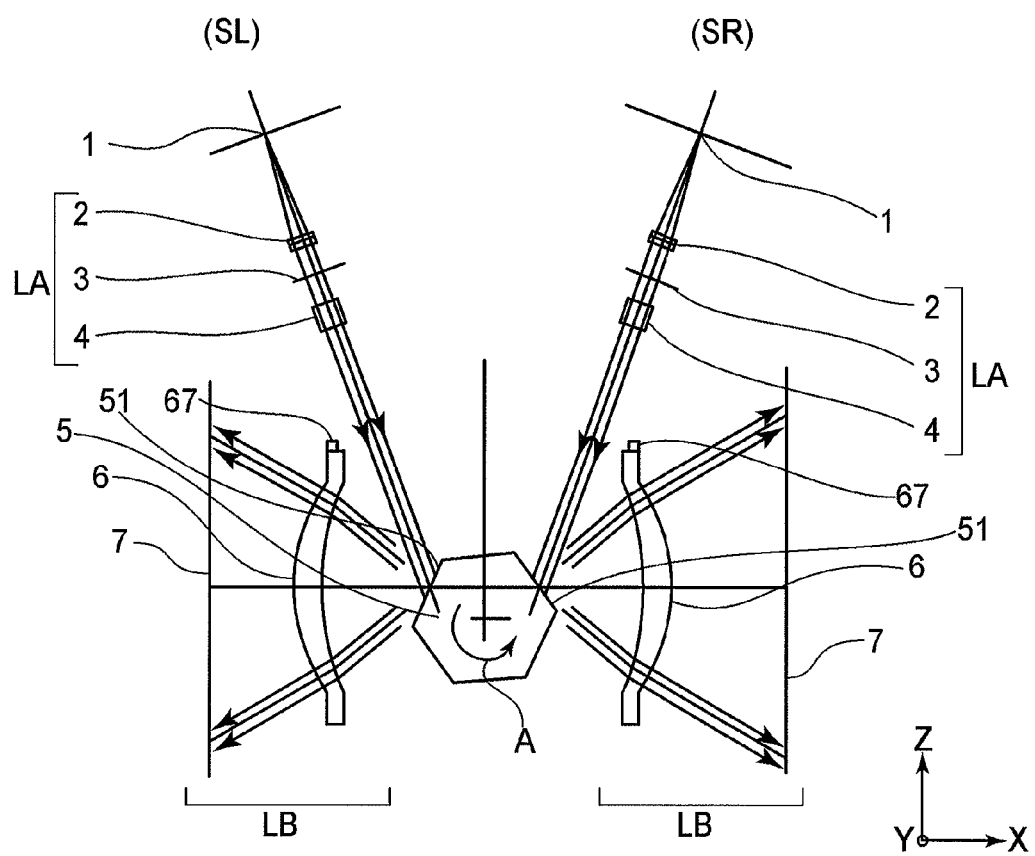
FIG. 2 is a main-scan sectional view of the first embodiment of the present invention.
Figure 3:
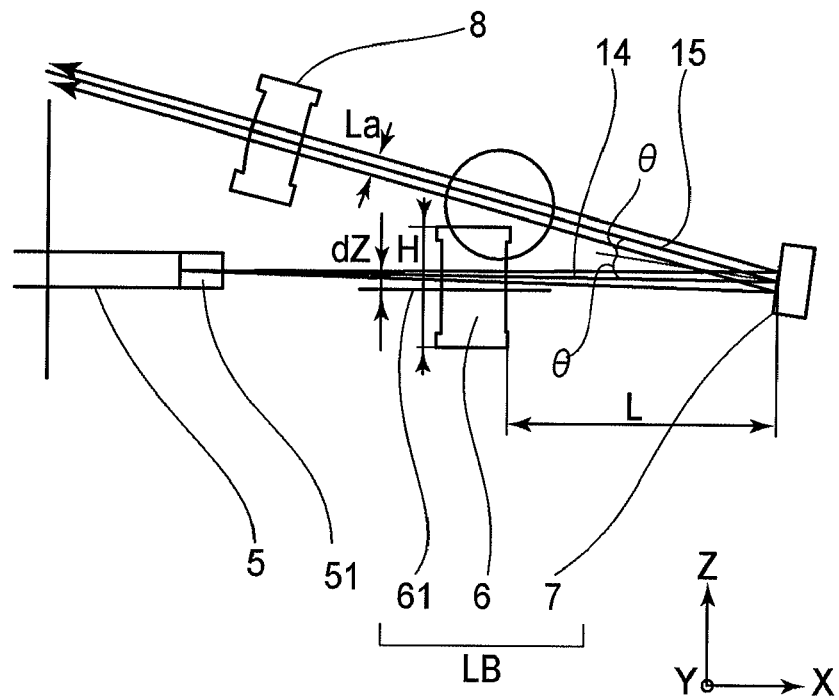
FIG. 3 is an enlarged view of a portion of the sub-scan sectional view of the first embodiment of the present invention.

FIG. 1 is a sectional view (sub-scan sectional view) of a main portion of a first embodiment of the present invention, along a sub-scan direction. FIG. 2 is a sectional view (main-scan sectional view) of a main portion of the first embodiment of the present invention, along a main-scan direction. FIG. 3 is a sectional view (sub-scan sectional view) of a portion of FIG. 1 in the sub-scan direction.

It should be noted that, in the following description, the term "main-scan direction" (Y-direction) refers to a direction in which a light beam is scanningly deflected by an optical deflector.

The term "sub-scan direction" (Z-direction) refers to a direction which is parallel to the rotational axis of the deflecting means.

The term "main-scan section" refers to a plane with respect to which the sub-scan direction (Z-direction) is a normal.

The term "sub-scan section" refers to a plane with respect to which the main-scan direction (Y-direction) is a normal.

In FIG. 1-FIG. 3, the image forming apparatus comprises two optical scanning devices SR and SL. Since these two optical scanning devices SR and SL have a laterally symmetric structure with respect to an optical deflector 5 and they have the same optical function, the following description will be made mainly with regard to the optical scanning device SR.

In these diagrams, denoted at 1 is light source means which comprises a semiconductor laser. Denoted at 2 is a condenser lens (collimator lens) which serves to convert a divergent light beam emitted from the light source means 1 into a parallel light beam.

It should be noted that the incident light beam on the condenser lens 2 is not limited to a parallel light beam, but it may be a convergent light beam or a divergent light beam.

Denoted at 3 is an aperture stop which restricts a light beam passing therethrough to shape the beam profile. Denoted at 4 is a cylindrical lens which has a predetermined power only in the sub-scan section (sub-scan direction). It functions to image, in the sub-scan section, the light beam passed through the aperture stop 3 as a line image upon the deflecting surface (reflection surface) 51 of the deflecting means 5 to be described below.

It should be noted that the condenser lens 2 and the cylindrical lens 4 may be constituted integrally as a single optical element (anomorphic lens).

Furthermore, the elements such as the condenser lens 2, aperture stop 3 and cylindrical lens 4 are components of an input optical system LA which makes the light beam from the light source means be incident on the deflecting means 5.

Denoted at 5 is an optical deflector as deflecting means (polygon mirror), having a six-surface structure. It scanningly deflects the light beam from the light source means 1.

The optical deflector 5 is rotationally operable and, through the rotational motion at a constant speed in a predetermined direction made by a motor, not shown, it scans the scan surface 11 in the main-scan direction.

Denoted at LB is an imaging optical system (f-θ lens system). The imaging optical system LB in the present embodiment is comprised of a plurality of (two in this example) transmission type imaging optical elements (first and second imaging lenses 6 and 8) for directing the light beam from the optical deflector 5 to the scan surface 8.

The imaging optical system LB functions to image, into a spot, the light beam based on the imagewise information and scanningly deflected by the optical deflector 5 which is being rotated, upon a photosensitive drum surface 11 as the scan surface, within the main-scan section (main-scan direction).

Furthermore, it serves to provide an optically conjugate relationship between the deflecting surface 51 of the rotating optical deflector 5 and the photosensitive drum surface 11, in the sub-scan section, thereby to accomplish surface tilt compensation.

Denoted at 7 and 9 are first and second reflecting mirrors each for folding the light path. These mirrors are disposed along the light path between the optical deflector 5 and the scan surface 11.

Of the first and second reflecting mirrors 7 and 9, the first reflecting mirror 7 which is the reflection type optical element optically nearest to the optical deflector 5 is located between the first and second imaging lenses 6 and 8 (two transmission type imaging optical elements).

The first and second reflecting mirrors 7 and 9 as the reflection type optical elements are comprised of a plane mirror having no power.

It should be noted that, in the present embodiment, the word "optical" means the direction in which a light beam advances.

Denoted at 10 is a cover glass, and denoted at 11 is a photosensitive drum surface as the scan surface.

Denoted at 61 is a central line of the contour (outer configuration) of a holding frame (not shown) of the transmission type imaging optical element, which holding frame is arranged to hold the imaging lens as an optical element. Denoted at 14 is a light beam (scan light beam) scanningly deflected by the deflecting surface 51. Denoted at 15 is a light path as reflected by the first mirror 7. Denoted at 67 is a gate.

The optical scanning device of the present embodiment is a deflection in-plane scanning system in which the scan is made within a plane perpendicular to the deflecting surface of the optical deflector (polygon mirror) 5, in the sub-scan section as shown in FIG. 1.

Thus, the input optical system LA extending from the light source means 1 to the cylindrical lens 4 is disposed within the sheet of the drawing which corresponds to the deflecting surface, as shown in FIG. 2.

Furthermore, the light beam being incident on the deflecting surface 51 of the optical deflector 5 is incident with a limited angle with respect to the optical axis of the imaging optical system LB, within the main-scan section.

Furthermore, in this embodiment, as can be seen from FIG. 2, identical optical scanning devices SR and SL are disposed at the right-hand side and left-hand side of the optical deflector 5, and this optical deflector 5 is used in common for both of them to scan a plurality of scan surfaces.

The specifications of the optical scanning device in the first embodiment of the present invention are shown in Table 1, Table 2 and Table 3, below.

TABLE 1

Table 1: Incidence Angle inside Deflection Plane

| | Surface | R | D | N |
|---|---|---|---|---|
| Light Source 1 | 1 | | 30.28 | 1.000 |
| Condensing Lens 2 | 2 | 46.63203 | 1.00 | 1.785 |
| | 3 | 15.51899 | 2.00 | 1.582 |
| | 4 | −21.487 | 6.00 | 1.000 |
| Stop 3 | 5 | infinite | 5.92 | 1.000 |
| Cylinder Lens 4 | 6 | aspherical (specified below) | 7.00 | 1.511 |
| | 7 | infinite | 83.90 | 1.000 |
| Deflecting Surface 5 | 8 | infinite | 30.00 | 1.000 |
| 1st Imaging Lens 7 | 9 | aspherical (specified below) | 7.50 | 1.524 |
| | 10 | aspherical (specified below) | 91.00 | 1.000 |
| 2nd Imaging Lens 9 | 11 | aspherical (specified below) | 5.50 | 1.524 |
| | 12 | aspherical (specified below) | 66.00 | 1.000 |
| Cover Glass 10 | 13 | infinite | 1.80 | 1.511 |
| | 14 | infinite | 64.70 | 1.000 |
| Scan Surface 11 | 15 | infinite | | |

TABLE 2

Table 2: Aspherical Shape

| | | 6th Surface | 9th Surface | 10th Surface | 11th Surface | 12th Surface |
|---|---|---|---|---|---|---|
| Meridional Shape | R | infinite | −6.39E+01 | −4.17E+01 | −1.16E+03 | 1.58E+03 |
| | K | 0 | −4.85E+00 | −1.30E+00 | 0 | −1.38E+03 |
| | B4 | 0 | 2.89E−07 | 7.71E−08 | 0 | −1.65E−07 |
| | B6 | 0 | −2.58E−10 | 1.27E−10 | 0 | 1.16E−11 |
| | B8 | 0 | −5.12E−14 | −3.67E−13 | 0 | −6.82E−16 |
| | B10 | 0 | 9.72E−17 | 1.58E−16 | 0 | 7.98E−20 |
| Sagittal Shape | r | 44.88 | −1.00E+03 | −1.00E+03 | −1.00E+03 | −3.33E+01 |
| | D2 | 0 | 0 | 0 | 0 | 4.77E−05 |
| | D4 | 0 | 0 | 0 | 0 | −6.42E−09 |
| | D6 | 0 | 0 | 0 | 0 | 6.48E−13 |
| | D8 | 0 | 0 | 0 | 0 | −3.28E−17 |
| | D10 | 0 | 0 | 0 | 0 | 5.15E−22 |

The circumscribed circle of the polygon mirror=φ40;
No. of deflecting surfaces of the polygon mirror=6;
The angle defined between the optical axes of the input optical system and the imaging optical system=70 degrees;
The polygon mirror reflecting point of the image-center light beam with respect to the center (0, 0) of the polygon mirror=(15.05, 8.71);
The distance between the center of the polygon mirror and the reflecting mirror=85;
The incidence angle defined between a normal to the first reflecting mirror and the incident light beam=7.3 degrees;
The distance from the first reflecting mirror to the second reflecting mirror=140; and
The incidence angle defined between a normal to the second reflecting mirror 9 and the incident light beam is =62.3 degrees.

TABLE 3

Table 3

| Fθm | 227.1 |
|---|---|
| Fθs | 65.4 |
| G1m | 205.5 |
| G1s | 740116 |
| G2m | −1276.9 |
| G2s | 65.6 |
| TC | 266.5 |
| φall | 0.01529 |
| φ1 | 1.4E−06 |
| φ2 | 0.01525 |
| φ1/φall | 8.8E−05 |
| |1/r1| + |1/r2| | 2.0E−03 |

Here, the expression is defined as follows.

The lens form (toric shape) comprises an aspherical shape which can be expressed by a function up to the tenth order with respect to the main-scan direction. Where the point of intersection with the optical axis is taken as an origin, the optical axis direction is taken as an x-axis, an axis in the main-scan section and orthogonal to the optical axis is taken as a y-axis, and an axis in the sub-scan section and orthogonal to the optical axis is taken as a z-axis, the meridional direction corresponding to the main-scan direction is expressed by:

$$X = \frac{Y^2/R}{1+\sqrt{\left(\frac{1-(1+K)}{(Y/R)^2}\right)^{1/2}}} + B_4Y^4 + B_6Y^6 + B_8Y^8 + B_{10}Y^{10}$$

wherein R is the curvature radius, and K, $B_4$, $B_6$, $B_8$ and $B_{10}$ are aspherical coefficients.

The sagittal direction corresponding to the sub-scan direction (a direction including the optical axis and orthogonal to the main-scan direction) is expressed by:

$$S = \frac{Z^2/r'}{1+(1-(Z/r')^2)^{1/2}}$$

wherein r'=r0(1+$D_2Y^2$+$D_4Y^4$+$D_6Y^6$+$D_8Y^8$+$D_{10}Y^{10}$), where r0 is the sagittal curvature radius on the optical axis, and $D_2$, $D_4$, $D_6$, $D_8$ and $D_{10}$ are coefficients.

Furthermore, in the tables:

The focal length of the first imaging lens in the main-scan direction is denoted by G1m;

The focal length of the second imaging lens in the main-scan direction is denoted by G2m;

The combined focal length of the first imaging lens and the second imaging lens in the main-scan direction is denoted by fθm;

The focal length of the first imaging lens in the sub-scan direction is denoted by G1s, and the power thereof is denoted by $\phi_1$;

The focal length of the second imaging lens in the sub-scan direction is denoted by G2s, and the power thereof is denoted by $\phi_2$;

The combined focal length of the first imaging lens and the second imaging lens in the sub-scan direction is denoted by fθs, and the power thereof if denoted by $\phi_{all}$; and The distance from the polygon mirror to the scan surface is denoted by TC.

Furthermore, in the tables, the symbol "e-X" means "$\times 10^{-X}$".

In the present embodiment, the divergent light beam emitted from the semiconductor laser 1 is converted into a parallel light beam by the condenser lens 2. Then, the light beam (light quantity) is restricted by the aperture stop 3, and thereafter it is incident on the cylindrical lens 4.

Inside the main-scan section, the light beam incident on the cylindrical lens 4 emerges therefrom without being changed, and impinges on the deflecting surface 51 of the optical deflector 5.

Inside the sub-scan section, on the other hand, the light beam is further converged and imaged as a line image (a line image extending in the main-scan direction) upon the deflecting surface 51 of the rotating optical deflector 5.

Here, the light beam from the input optical system LA is perpendicularly incident on the deflecting surface of the optical deflector 5 in the sub-scan section, and it is focused on the deflecting surface 51.

Furthermore, the light beam being incident on the deflecting surface 51 of the optical deflector 5 is incident with a limited angle with respect to the optical axis of the imaging optical system LB in the main-scan section.

Then, the light beam scanningly deflected by the deflecting surface 51 of the optical deflector 5 passes through the first imaging lens 6; then it is reflected by the first reflecting mirror 7; then it passes through the second imaging lens 8; then it is reflected by the second reflecting mirror 9; and finally it is imaged into a spot shape on the photosensitive drum surface 11.

In this way, the image recording is carried out on the photosensitive drum surface 11 as a recording medium.

Next, the optical function of the imaging optical system LB which is comprised of first and second imaging lenses 6 and 8, will be explained.

In the present embodiment, the first and second imaging lenses 6 and 8 are made of resin (plastic).

The imaging optical system LB images the light beam scanningly deflected by the optical deflector 5 upon the scan surface 11 to form a beam spot thereon and to scan the scan surface 11 at a constant speed.

The imaging lens made of resin is produced by a known molding technique of filling a die with resin and removing it out of the die after cooling.

In this way, the imaging lens can be produced more easily as compared with a conventional imaging lens based on a glass lens.

As shown in Table 1, the first imaging lens 6 having a power (refracting power) mainly in the main-scan direction has an aspherical surface shape having a lens form being expressed by the function of the equation given above.

In the present embodiment, the first imaging lens 6 (transmission type imaging optical element A) whose distance between the light path 15 reflected by the first reflecting mirror 7 as a reflection type optical element and the outer circumferential portion of one of the holding frames (not shown) for the transmission type imaging optical elements, holding a plurality of imaging lenses, is shortest has a smaller power in the sub-scan direction than the power in the main-scan direction.

Also, the first imaging lens 6 is comprised of a meniscus shaped lens (meniscus lens) having a non-arcuate shape in the main-scan section and having a concave surface facing to the optical deflector 5 side.

Furthermore, the shape of the first imaging lens 6 in the main-scan section is symmetric with respect to the optical axis.

Furthermore, with regard to the sub-scan direction, the light entrance surface and the light exit surface thereof have no power and have the same curvature. However, both surfaces may have a cylindrical shape being flat in the sub-scan direction.

It provides an imaging function mainly in the main-scan direction, relative to the incident light beam.

The holding frame is formed integrally with the transmission type imaging optical element through a molding process. However, the holding frame may be formed separately from the transmission type imaging optical element.

On the other hand, the second imaging lens 8 is an anamorphic lens having a power mainly in the sub-scan direction, as shown in Table 1. The lens form is an aspherical surface shape as expressed by the function of the equation given above.

The second imaging lens 8 has a larger power in the sub-scan direction (in the sub-scan section) than the power in the main-scan direction (in the main-scan section). Also, the light entrance surface thereof in the main-scan section has an arcuate shape, and the other surface has a non-arcuate shape.

The shape in the main-scan section is symmetric with respect to the optical axis, and it has no power in the main-scan direction, on the axis.

With regard to the shapes in the sub-scan section, the light entrance surface has a flat surface having an extraordinarily slow curvature, whereas the light exit surface has a convex shape in which the curvature changes gradually from the optical axis to the outside the optical axis, and the shape is symmetric with respect to the optical axis.

For the light beam incident thereon, this lens has a function of imaging in the sub-scan direction and a function of slightly correcting the distortion in the main-scan direction.

With regard to the imaging relationship in the sub-scan direction of the imaging optical system LB which is comprised of the first and second imaging lenses 6 and 8, it provides a what can be called a surface tilt correction system in which the deflecting surface 51 and the scan surface 7 are in a conjugate relationship.

It is to be noted that the imaging optical system LB should not always be a function expression as shown in the Table 1, but it may be a known expression.

Furthermore, it may have an asymmetric shape with respect to the optical axis, for further improved imaging performance.

In this embodiment, as shown in FIG. 3, after the light beam (scan light beam) 14 scanningly deflected by the deflecting surface 51 is incident on the first imaging lens 6, it is reflected by the first reflecting mirror 7.

Within the sub-scan section, the first imaging lens 6 is so disposed that, to avoid interference with the light path reflected by the reflection optical element, the contour central line 61 of holding frame (not shown) of the transmission type imaging optical element is located at a side of the central line (principal ray) of the light beam incident on the first imaging lens 6, which side is remote from the reflected light path 15.

Namely, in this embodiment, by shifting the first imaging lens 6 in a direction perpendicular to the scan light beam 14 and only by a physical distance (shift amount) dZ to be described below, the interference between the reflected light path 15 and the first imaging lens 6 is avoided.

Based on this avoidance of interference, the reflection angle θ at the first reflecting mirror 7 can be made small, and this contributes to the reduction in height of the device in the sub-scan direction.

It should be noted that, as shown in Table 1, the curvature radius r of the first imaging lens 6 in the sub-scan direction is 1000, and this lens is so designed that the vertex thereof coincides with the contour central line 61.

In this embodiment, if the angle defined between the principal ray of the light beam reflected by the first reflecting mirror 7 and a normal to the first reflecting mirror 7 is denoted by θ, the following condition is satisfied.

$$\theta \leq 45 \text{ degrees} \qquad (3)$$

The conditional expression (3) specifies the reflection angle θ reflected by the first reflecting mirror 7.

If the upper limit of the conditional expression (3) is exceeded, it does not contribute to reduction in size of the overall system any more. Namely, if the reflection angle θ exceeds 45 degrees, the angle defined between the principal ray of the scan light beam 14 and the reflected light path 15 becomes larger than 90 degrees and thus the compactness in the horizontal direction will be lost.

Therefore, the reflection angle θ had better be set not greater than 45 degrees.

Preferably, the aforementioned conditional expression (3) had better be set as follows.

$$\theta \leq 30 \text{ degrees} \qquad (4)$$

In the present embodiment, as shown in Table 1, θ=7.3 degrees. This satisfies the conditional expression (3) as well as the conditional expression (4).

Furthermore, in the present embodiment, if the height of the outer configuration of the holding frame of the transmission type imaging optical element which holds the first imaging lens 6 is denoted by H, and the physical distance (shift amount) from the contour central line 61 to the principal ray of the incident light beam (scan light beam) 14 is denoted by dZ, then the following condition is satisfied.

$$0.05 < dZ/H < 0.5 \qquad (5)$$

The conditional expression (5) concerns the ratio between the physical distance from the contour central line 61 to the incident light beam 14 and the height of the contour.

If the conditional expression (5) is not satisfied, the light path extension becomes difficult to do. Also, it becomes difficult to reduce height of the device in the sub-scan direction.

More preferably, the conditional expression (5) had better be set as follows.

$$0.07 < dZ/H < 0.3 \qquad (6)$$

In the present embodiment, H=13.0 mm and dZ=1.5 mm. Thus, dZ/H=0.115. This satisfies the conditional expression (5) as well as the conditional expression (6).

In the present embodiment, as can be seen from FIG. 3, the height of the device in the sub-scan direction can be reduced by making the angle θ small.

Here, the first imaging lens 6 should be shifted in a direction perpendicular to the scan light beam 14 to avoid interference between the reflected light path 15 and the first imaging lens 6.

Although the height reduction effect can be enhanced if the shift amount dZ is made larger, the largest possible shift amount is ½ of the lens height H, and this determines the upper limit of the conditional expression (5).

Furthermore, in a resin lens which is molded by a die, if the lens height is made low as compared with the lens thickness in the optical axis direction, during the cooling process just after the lens is disengaged from the mold, cooling occurs and progresses from the upper and lower portions of the lens.

As a result of this, a refractive index distribution and a birefringence distribution are easily created inside the lens, within the sub-scan section (lens height direction).

It is known that this influence becomes more remarkable as the distance from the central axis of the lens contour becomes larger and that the imaging performance degrades steeply from around two-thirds (⅔) of the span from the contour center to the outer peripheral edge.

Therefore, if the imaging performance of the device is a priority, the ratio should preferably satisfy dZ/H<0.3.

The upper limit of the conditional expression (6) specifies this.

The lower limit of the conditional expressions (5) and (6) defines the lower limit of the shift amount of the first imaging lens 6.

If the shift amount is small, the effect of interference prevention of the interference between the reflected light path 15 and the first imaging lens 6 become insufficient, and the interference would occur if the position of the reflected light path 15 or the position of the first imaging lens 6 varies because of the tolerance at the time of the assembly.

In the present embodiment, as described above, the power of the first imaging lens 6 in the sub-scan direction is made smaller than the power thereof in the main-scan direction.

Here, the light beam width of the light beam reflected by the first reflecting mirror 7 is taken as La, and that the distance from the first imaging lens 6 to the first reflecting mirror 7 is taken as L.

Furthermore, the reflection angle defined between the principal ray of the light beam reflected by the first reflecting mirror 7 and a normal to the first reflecting mirror 7 is taken as θ, and the height of the contour of the holding frame of the transmission type imaging optical element is taken as H.

Then, the shift amount dZ of the first imaging lens 6 should preferably satisfy the following condition.

$$5 < dZ \qquad (7)$$

The conditional expression (7) is a condition for specifying the shift amount dZ of the first imaging lens 6.

If the conditional expression (7) is not satisfied, the effect of interference prevention of the interference between the reflected light path 15 and the first imaging lens 6 becomes insufficient, as like the conditional expression (5), and the interference would occur if the position of the reflected light path 15 or the position of the first imaging lens 6 varies because of the tolerance at the time of the assembly.

In this embodiment, if the power of the first imaging lens 6 (transmission type imaging optical element C) in the sub-scan section is denoted by $\phi_i$, and the power of the imaging optical system LB in the sub-scan section is denoted by $\phi_{all}$, the following condition is satisfied.

$$|\phi_i/\phi_{all}| \leq 0.01 \quad (1)$$

The conditional expression (1) is a condition for specifying the ratio between the power of the imaging lens 6 in the sub-scan direction (1/"focal length") constituting the imaging optical system LB and the power (1/"focal length") of the imaging optical system LB.

Namely, the conditional expression (1) specifies that the power ratio of the first imaging lens 6 is set to be smaller than a specified amount.

If the power ratio of the first imaging lens 6 becomes large beyond the upper limit of the conditional expression (1), the aberration will deteriorate when the power ratio of the first imaging lens 6 is shifted in parallel relative to the optical axis, as described above, such that spot diameter deterioration and scan line curve will occur.

In this embodiment, as shown in Table 1, there is a relation:

$$|\phi_i/\phi_{all}| \leq 8.8E{-}05$$

This satisfies the conditional expression (1).

More preferably, the conditional expression (1) had better be set as follows.

$$0.00001 \leq |\phi_i/\phi_{all}| \leq 0.00500 \quad (1a)$$

Furthermore, in this embodiment, if the curvature radii of the first imaging lens 6 at the optical deflector side and the scan surface side are denoted by R1 and R2, respectively, the following condition is satisfied.

$$|1/R1| + |1/R2| < 0.0067(1/mm) \quad (2)$$

The conditional expression (2) is a condition for specifying the curvature of the first imaging lens 6, constituting the imaging optical system LB, in the sub-scan direction.

Namely, the conditional expression (2) specifies that the curvatures of the light entrance surface and the light exit surface of the first imaging lens 6, in the sub-scan direction, are set to be smaller than a specified amount.

If the curvature of the light entrance surface and the light exit surface of the first imaging lens 6 in the sub-scan direction becomes large beyond the upper limit of the conditional expression (2), the aberration will deteriorate when the power ratio of the first imaging lens 6 is shifted in parallel relative to the optical axis, as described above, such that spot diameter deterioration and scan line curve will occur.

The light entrance surface and the light exit surface are comprised of an optical surface (lens surface).

In the present embodiment as shown in Table 1, there is a relation:

$$|1/R1| + |1/R2| = 2.0E{-}03(1/mm)$$

This satisfies the conditional expression (2).

More preferably, the conditional expression (2) had better be set as follows.

$$0.0010(1/mm) < |1/R1| + |1/R2| < 0.0047(1/mm) \quad (2a)$$

It is a feature of the present embodiment that, as described above, of the imaging lenses constituting the imaging optical system LB, the first imaging lens 6 having a very small power in the sub-scan direction is shifted in the sub-scan section relative to the scan light beam 14.

It should be noted that the power of the first imaging lens 6 in the sub-scan direction may be zero (non-power).

Furthermore, the curvature of the first imaging lens 6 is very slow as described above. Therefore, even if it shifts in the sub-scan section, the Fresnel reflected light which occurs at the lens surface of the first imaging lens 6 goes back to the optical deflector 5.

In consideration of this, in the present embodiment, a sufficient distance is secured between the optical deflector 5 and the first imaging lens 6 and, furthermore, the thickness of the optical deflector 5 in the height direction thereof is kept to 2 mm or less. Thus, the structure is configured to avoid adverse influence of the Fresnel reflected light which might otherwise cause flare or ghost light.

Furthermore, a coating may be provided on the lens surface of the first imaging lens 6.

On the other hand, in the present embodiment as described above, of the first and second imaging lenses 6 and 8, the first imaging lens 6 (transmission type imaging optical element C) which has a smallest power or zero power in the sub-scan direction is shifted in the sub-scan section relative to the scan light beam 14.

With this arrangement, in this embodiment, adverse influences on aberration deterioration and scan line curve are reduced.

In this embodiment, the first imaging lens 6 is shifted in the sub-scan direction by a physical distance dZ=1.5 mm, by which the drift of the scan line curve is suppressed to about 1 μm or less, which is a level that can be disregarded.

Furthermore, in the present embodiment as described above, the first reflecting mirror 7 is provided to be located on the light path between the first imaging lens 6 and the second imaging lens 8.

With this arrangement, in this embodiment, the size of the system can be made small in both of the horizontal direction and vertical direction.

If the first reflecting mirror 7 as a reflection type optical element is provided after the second imaging lens 8, the width in the horizontal direction becomes large.

Furthermore, if the first reflecting mirror 7 as a reflection type optical element is provided at the light path between the first imaging lens 6 and the optical deflector 5, the size in the vertical direction cannot be made small, though the size in the horizontal direction can be made small.

Therefore, for smallness in size in both of the horizontal direction and vertical direction, the first reflecting mirror 7 should preferably be provided on the light path between the first imaging lens 6 and the second imaging lens 8.

In this embodiment, as shown in FIG. 1, optical scanning devices SR and SL having the same structure are provided at the right and left of the optical deflector 5, symmetrically with respect to the plane including the rotational axis of the optical deflector 5, and the optical deflector 5 is used in common for scanning a plurality of scan surfaces.

However, the reflection angle of the second reflecting mirror 9 is different between the optical scanning devices SR and SL, as shown in FIG. 1.

The reflection angle of the second reflecting mirror 9 may be set appropriately in accordance with the component disposition of the image forming apparatus.

In the present embodiment as described above, with the structure explained above, the interference between the light beam reflected by the first reflecting mirror 7 and the first imaging lens 6 can be avoided. Therefore, the number of reflecting mirrors to be used can be reduced, and a compact structure of an optical scanning device is accomplished.

Furthermore, since in this embodiment the power of the first imaging lens 6 in the sub-scan direction which is lens to be shifted is made low, by which deterioration of aberration due to the shift can be suppressed and a good imaging state of the spot can be held.

Furthermore, in the present embodiment, in both of the left-hand side and right-hand side imaging optical systems LB as shown in FIG. 2, gate members (gates) 67 for the first imaging lenses 6 are provided in the same direction.

By providing the gate members 67 in this way, the same components can be used for the left-hand side and right-hand side imaging lenses 6 and 8.

It should be noted that the present embodiment may use light source means (multi-beam light source) having a plurality of light emitting members (light emission points).

Embodiment 2

Figure 4:
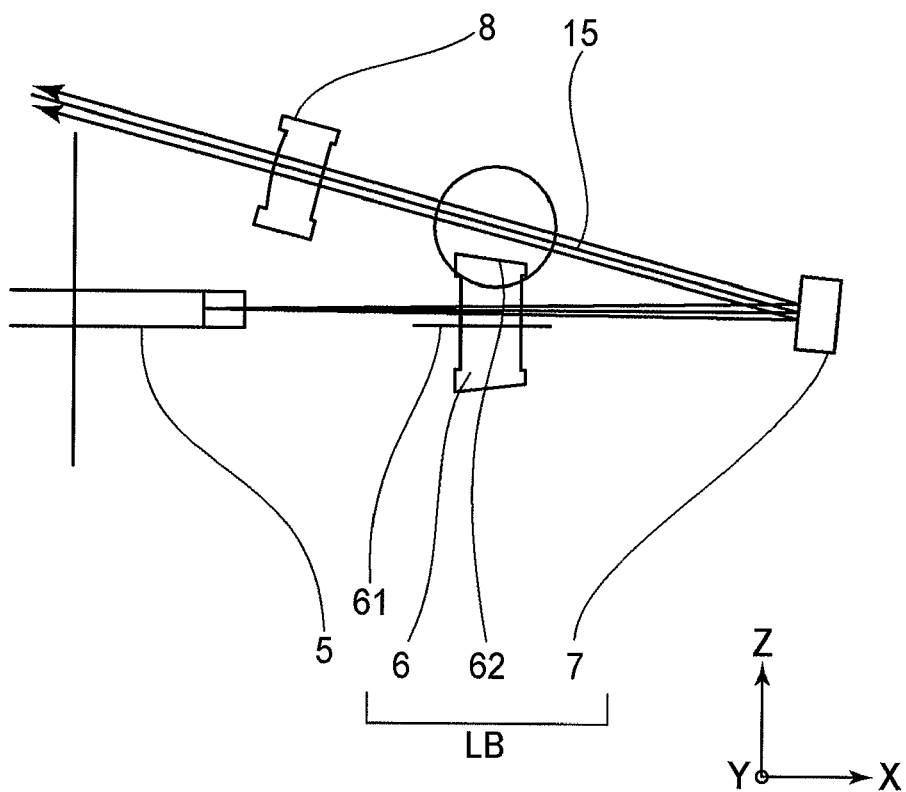
FIG. 4 is an enlarged view of a portion of a sub-scan sectional view of a second embodiment of the present invention.

FIG. 4 is a sub-scan sectional view of a main portion of a second embodiment of the present invention. In FIG. 4, like numerals are assigned to components corresponding to those of FIG. 3.

The present embodiment differs from the abovementioned first embodiment in that the end surface 62 at the outer circumferential portion of a holding frame of the transmission type imaging optical element, holding the first imaging lens 6, is formed by a tapered shape extending along the light path 15.

Other structures and optical functions are similar to the first embodiment and, based on this, similar advantageous effects are obtainable.

More specifically, in this embodiment, by forming the end surface (slant portion) 62 at the outer circumferential portion of the holding frame (not shown) of the transmission type imaging optical element, which holds the first imaging lens 6, with a tapered shape extending along the light path 15, reduction in the height of the device in the sub-scan direction is assured.

Generally, for resin lenses to be molded by using a die, a releasing taper is provided at the outer circumferential portion of the lens which is in parallel to the lens optical axis direction, to thereby reduce deformation when the lens is disengaged from the die.

In this embodiment, the slant direction of this releasing taper is extended along the light path 15 reflected by the first reflecting mirror 7 as a reflection type optical element.

With this structure, avoidance of interference between the first imaging lens 6 and the light path 15 reflected by the first reflecting mirror 7 is facilitated, such that the reflection angle θ of the first reflecting mirror 7 can be made much smaller and the height reduction of the device in the sub-scan direction is further improved.

Embodiment 3

Figure 5:
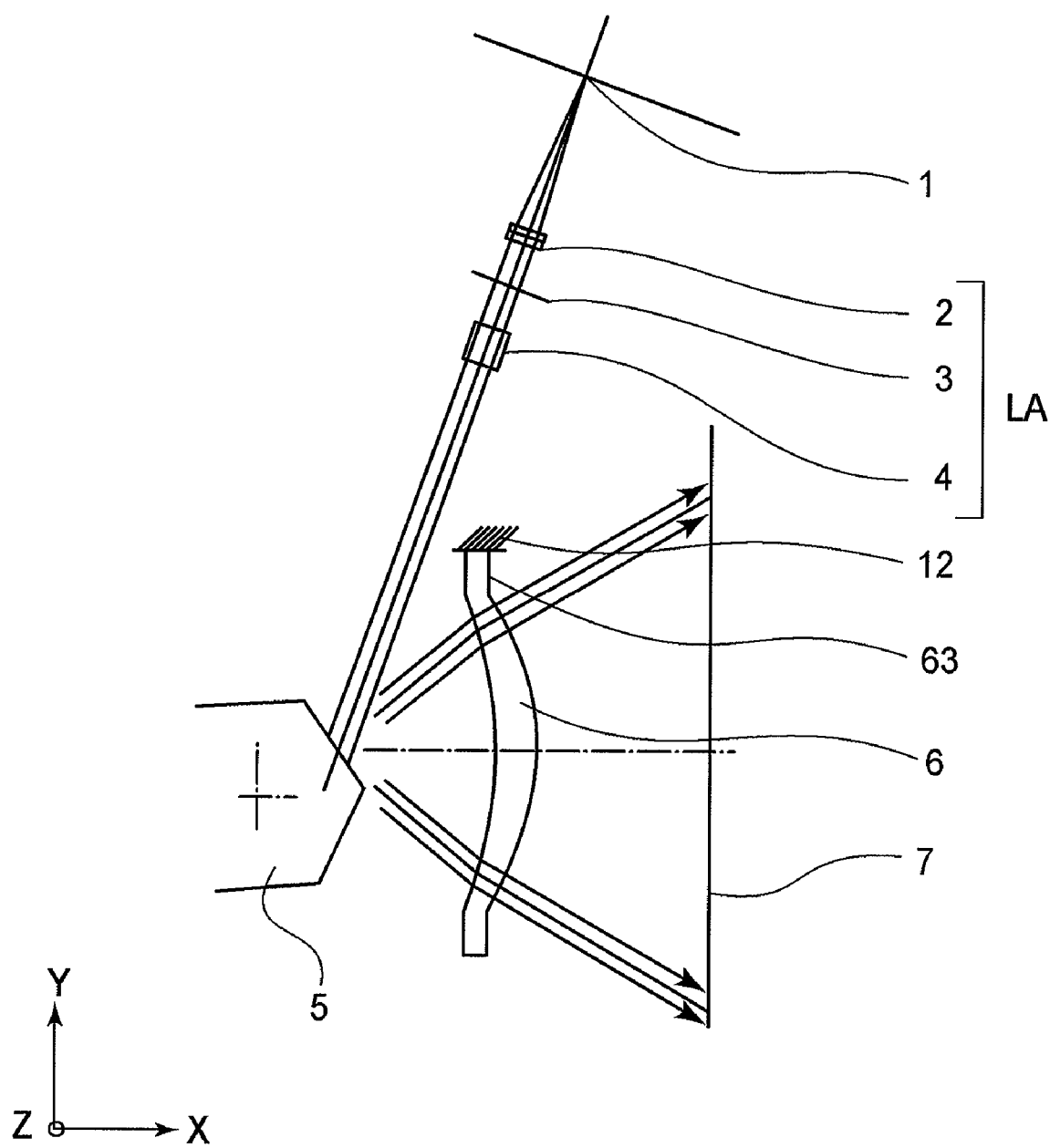
FIG. 5 is an enlarged view of a portion of a sub-scan sectional view of a third embodiment of the present invention.

FIG. 5 is a main-scan sectional view of a main portion of a third embodiment of the present invention. In FIG. 5, like numerals are assigned to components corresponding to those of FIG. 2.

The present embodiment differs from the abovementioned first embodiment in that the first imaging lens 6 is provided with a reference surface 63 for the positioning of the lens within the main-scan section, and this reference surface is formed outside the effective region of the lens surface of the first imaging lens.

Other structures and optical functions are similar to the first embodiment and, based on this, similar advantageous effects are obtainable.

More specifically, in this embodiment, the reference surface 63 of the first imaging lens 6 for the positioning of the lens with in the main-scan section is formed outside the effective region of the lens surface of the first imaging lens and, in addition to this, the reference surface 63 is provided with a seat 12 as a positional reference.

As seen from FIG. 5, the seat 12 is disposed outside the effective portion of the first imaging lens 6 in the main-scan direction.

Furthermore, the seat 12 is formed on a frame member (not shown), and it serves as a position reference in the main-scan direction of the first imaging lens 6.

Conventionally, in general, the positional reference with respect to the main-scan direction is provided above and below the central portion of the first imaging lens 6 in the scan direction in FIG. 1, for example. However, if a positional reference is provided above and below the central portion of the first imaging lens 6 in the scan direction, it interferes with the light path 15 reflected by the first reflecting mirror 7.

In consideration of this, in this embodiment, the reference surface 63 for the positioning of the lens in the main-scan section is provided outside the effective region of the lens surface of the first imaging lens 6. The inconveniences described above can be removed by this.

Embodiment 4

Figure 6:
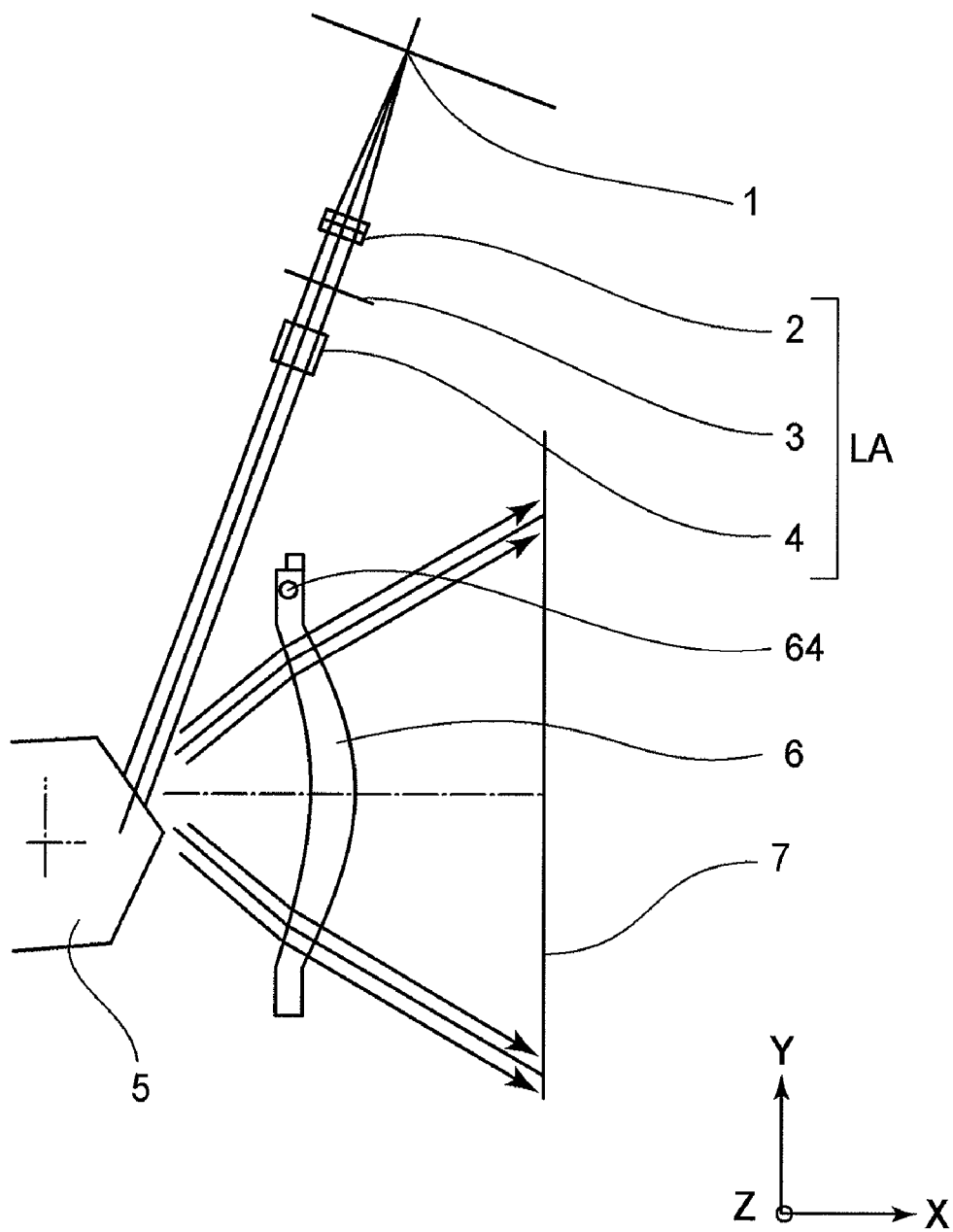
FIG. 6 is a main-scan sectional view of a fourth embodiment of the present invention.

FIG. 6 is a main-scan sectional view of a main portion of a fourth embodiment of the present invention. In FIG. 6, like numerals are assigned to components corresponding to those of FIG. 2.

The present embodiment differs from the abovementioned first embodiment in that a reference pin 64 for the positioning of the lens in the main-scan section is provided outside the effective region of the lens surface of the first imaging lens 6.

Other structures and optical functions are similar to the first embodiment and, based on this, similar advantageous effects are obtainable.

More specifically, in this embodiment, the reference pin 64 which functions as a positional reference for the positioning of the lens in the main-scan section is provided outside the effective region of the lens surface of the first imaging lens 6.

The reference pin 64 is configured to be fitted into a reference hole of a frame member, not shown.

Furthermore, as can be seen from FIG. 6, the reference pin 64 is provided out of the effective portion of the first imaging lens 6 in the main-scan direction, and it provides a positional reference for the first imaging lens 6 with respect to the main-scan direction.

Conventionally, in general, the positional reference with respect to the main-scan direction is provided above and below the central portion of the first imaging lens 6 in the scan direction in FIG. 1, for example. However, if a positional reference is provided above and below the central portion of the first imaging lens 6 in the scan direction, it interferes with the light path 15 reflected by the first reflecting mirror 7.

In consideration of this, in this embodiment, the reference pin 64 for the positioning of the lens in the main-scan section is provided outside the effective region of the lens surface of the first imaging lens 6. The inconveniences described above can be removed by this.

Embodiment 5

Figure 7:
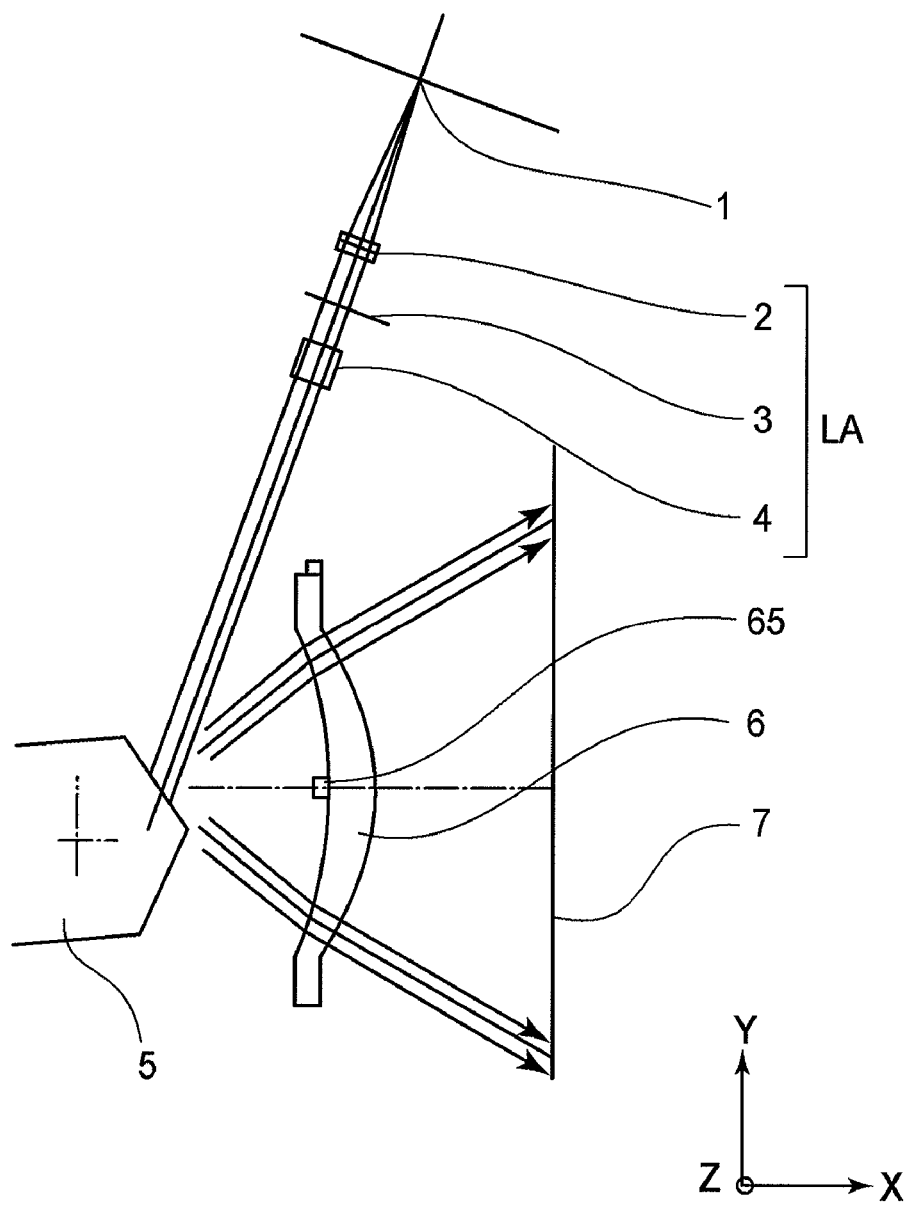
FIG. 7 is a main-scan sectional view of a fifth embodiment of the present invention.

FIG. 7 is a main-scan sectional view of a main portion of a fifth embodiment of the present invention. In FIG. 7, like numerals are assigned to components corresponding to those of FIG. 2.

The present embodiment differs from the abovementioned first embodiment in that a reference protrusion 65 for determining a reference position in the main-scan section is provided at the light entrance surface side of the first imaging lens 6.

Other structures and optical functions are similar to the first embodiment and, based on this, similar advantageous effects are obtainable.

More specifically, in this embodiment, the reference protrusion 65 which determines the reference position in the main-scan section is provided at the light entrance surface side of the first imaging lens 6.

The reference protrusion 65 is configured to be fitted into a reference hole of a frame member, not shown.

Furthermore, as can be seen from FIG. 7, the reference protrusion 65 is provided at the light entrance surface side of the first imaging lens 6.

Conventionally, in general, the positional reference with respect to the main-scan direction is provided above and below the central portion of the first imaging lens 6 in the scan direction in FIG. 1, for example. However, if a positional reference is provided above and below the central portion of the first imaging lens 6 in the scan direction, it interferes with the light path 15 reflected by the first reflecting mirror 7.

Furthermore, even if the reference protrusion 65 is provided at the light exit surface side of the lens, it easily interferes with the reflected light path 15.

In consideration of this, in this embodiment, the reference protrusion 65 which determines the reference position of the lens in the main-scan section is provided at the light entrance side of the first imaging lens 6. The inconveniences described above can be removed by this.

Embodiment 6

Figure 8:
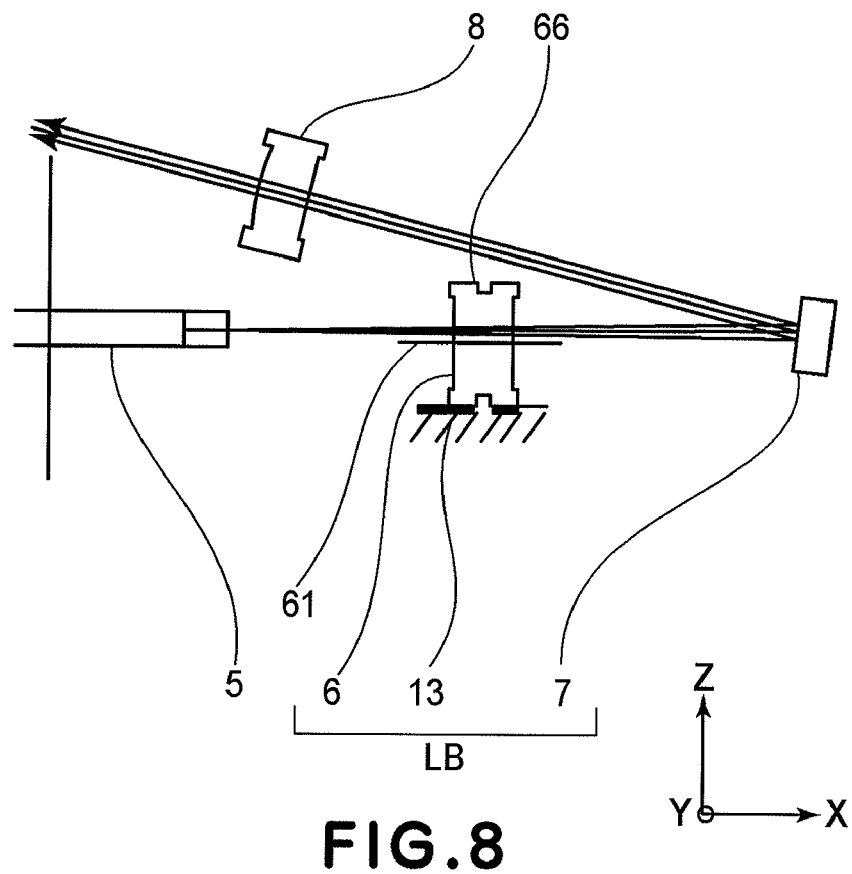
FIG. 8 is a main-scan sectional view of a sixth embodiment of the present invention.

FIG. 8 is a sub-scan sectional view of a main portion of a sixth embodiment of the present invention. In FIG. 8, like numerals are assigned to components corresponding to those of FIG. 4.

The present embodiment differs from the abovementioned first embodiment in that a reference member 66 of a concave shape for determining the reference position in the main-scan section is provided at an outer circumferential portion of the first imaging lens 6.

Other structures and optical functions are similar to first embodiment and, based on this, similar advantageous effects are obtainable.

More specifically, in this embodiment, the reference member 66 of concave shape which determines the reference position in the main-scan section is provided at an outer circumferential portion of the first imaging lens 6.

The reference hole (groove) 66 is configured to receive a reference pin 13 of a frame member.

Conventionally, in general, the positional reference with respect to the main-scan direction is provided above and below the central portion of the first imaging lens 6 in the scan direction in FIG. 1, for example. However, if a positional reference is provided above and below the central portion of the first imaging lens 6 in the scan direction, it interferes with the light path 15 reflected by the first reflecting mirror 7.

In consideration of this, in this embodiment, the reference member 66 of concave shape which determines the reference position of the lens in the main-scan section is provided at an outer peripheral portion of the first imaging lens 6. The inconveniences described above can be removed by this.

Embodiment 7

Figure 9:
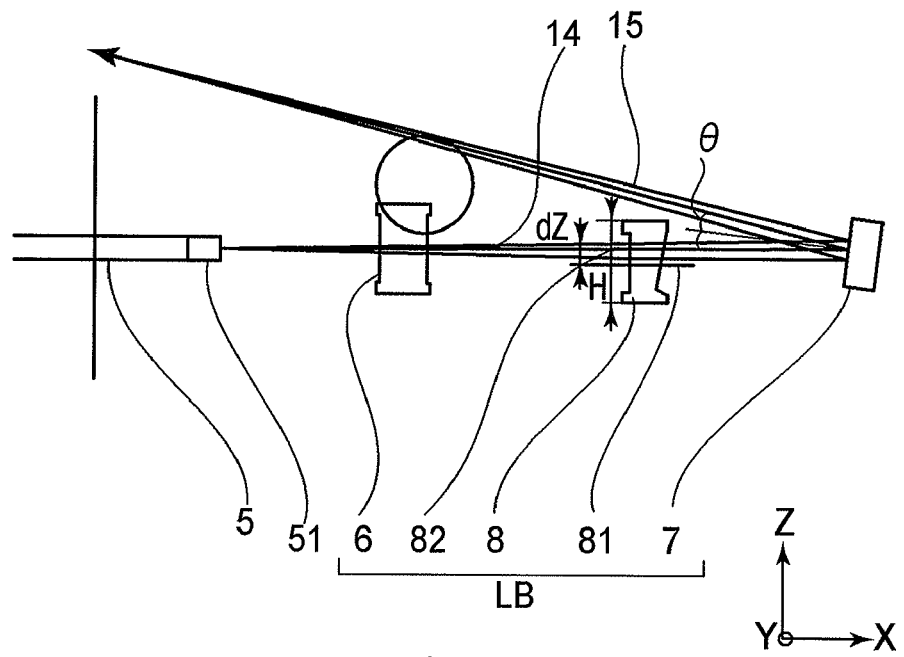
FIG. 9 is an enlarged view of a portion of a sub-scan sectional view of a seventh embodiment of the present invention.

FIG. 9 is a sub-scan sectional view of a main portion of a seventh embodiment of the present invention. In FIG. 9, like numerals are assigned to components corresponding to those of FIG. 3.

The present embodiment differs from the abovementioned first embodiment in that the second imaging lens 8 (hereinafter, also "transmission type imaging optical element B") whose distance between the light path 15 reflected by the first reflecting mirror 7 and the outer circumferential portion of the holding frame for the transmission type imaging optical element is shortest, is disposed between the first imaging lens 6 and the first reflecting mirror 7.

Furthermore, the structure is so configured that, in the sub-scan section, the optical axis 82 of the second imaging lens 8 do not coincide with the contour central line 81 of the holding frame of the transmission type imaging optical element.

Furthermore, the structure is so configured that the contour central line 81 of the holding frame of the transmission type imaging optical element is located at a side of the central line (principal ray) of the light beam incident on the second imaging lens 8, which side is remote from the reflected light path 15.

Other structures and optical functions are similar to the first embodiment and, based on this, similar advantageous effects are obtainable.

More specifically, in this embodiment, the second imaging lens 8 whose distance between the light path 15 reflected by the first reflecting mirror 7 and the outer circumferential portion of the holding frame for the transmission type imaging optical element is shortest, is disposed between the first imaging lens 6 and the first reflecting mirror 7.

The second imaging lens 8 has a power in the sub-scan direction, and it is a lens which is optically nearest to the scan surface 11.

Furthermore, this embodiment is so configured that, in the sub-scan section, the optical axis 82 of the second imaging lens 8 do not coincide with the contour central line 81 of the holding frame of the transmission type imaging optical element.

Furthermore, this embodiment is so configured that the contour central line 81 of the holding frame for the transmission type imaging optical element is located at a side of the principal ray of the light beam incident on the second imaging lens 8, which side is remote from the reflected light path 15.

Table 4, Table 5 and Table 6 below show the specifications of the optical scanning device according to the seventh embodiment of the present invention.

TABLE 4

| | Surface | R | D | N |
|---|---|---|---|---|
| Light Source 1 | 1 | | 30.28 | 1.000 |
| Condensing Lens 2 | 2 | 46.63203 | 1.00 | 1.785 |
| | 3 | 15.51899 | 2.00 | 1.582 |
| | 4 | −21.487 | 6.00 | 1.000 |
| Stop 3 | 5 | infinite | 5.92 | 1.000 |
| Cylinder Lens 4 | 6 | aspherical (specified below) | 7.00 | 1.511 |
| | 7 | infinite | 83.90 | 1.000 |

TABLE 4-continued

Table 4

| Surface | | R | D | N |
|---|---|---|---|---|
| Deflecting Surface 5 | 8 | infinite | 31.00 | 1.000 |
| 1st Imaging Lens 6 | 9 | aspherical (specified below) | 8.50 | 1.524 |
| | 10 | aspherical (specified below) | 60.00 | 1.000 |
| 2nd Imaging Lens 8 | 11 | aspherical (specified below) | 5.50 | 1.524 |
| | 12 | aspherical (specified below) | 95.00 | 1.000 |
| Cover Glass 10 | 13 | infinite | 1.80 | 1.511 |
| | 14 | infinite | 68.70 | 1.000 |
| Scan Surface 11 | 15 | infinite | | |

TABLE 5

Table 5: Aspherical Shape

| | | 6th Surface | 9th Surface | 10th Surface | 11th Surface | 12th Surface |
|---|---|---|---|---|---|---|
| Meridional Shape | R | infinite | −6.12E+01 | −4.06E+01 | −1.13E+03 | 2.23E+03 |
| | K | 0 | −3.84E+00 | −1.20E+00 | 0 | −1.07E+04 |
| | B4 | 0 | 1.93E−07 | 5.08E−08 | 0 | −2.51E−07 |
| | B6 | 0 | −2.97E−10 | 3.52E−10 | 0 | 1.60E−11 |
| | B8 | 0 | 1.14E−13 | −3.66E−13 | 0 | −6.08E−16 |
| | B10 | 0 | 9.88E−17 | 1.58E−16 | 0 | 5.26E−21 |
| Sagittal Shape | r | 44.88 | −1.00E+03 | 1.00E+03 | −1.00E+03 | −3.17E+01 |
| | D2 | 0 | 0 | 0 | 0 | 6.34E−05 |
| | D4 | 0 | 0 | 0 | 0 | −7.81E−09 |
| | D6 | 0 | 0 | 0 | 0 | 6.08E−13 |
| | D8 | 0 | 0 | 0 | 0 | −3.15E−17 |
| | D10 | 0 | 0 | 0 | 0 | 5.17E−22 |

The circumscribed circle of the polygon mirror=φ40;

No. of deflecting surfaces of the polygon mirror=6;

The angle defined between the optical axes of the input optical system and the imaging optical system=70 degrees;

The polygon mirror reflecting point of the image-center light beam with respect to the center (0, 0) of the polygon mirror=(15.05, 8.71);

The distance between the center of the polygon mirror and the first reflecting mirror=152; and The incidence angle defined between a normal to the first reflecting mirror and the incident light beam=7.1 degrees.

TABLE 6

Table 6

| Fθm | 226.2 |
|---|---|
| Fθs | 62.1 |
| G1m | 202.3 |
| G1s | −952.86 |
| G2m | −1431.8 |
| G2s | 62.4 |
| TC | 266.5 |
| φall | 0.01609 |
| φ1 | −0.001 |
| φ2 | 0.01602 |
| φ1/φall | −0.0652 |
| |1/r1| + |1/r2| | 2.0E−03 |

The expressions in the present embodiment are similar to the expressions in the abovementioned first embodiment. Furthermore, the definition of parameters for various components in the tables is similar to those of the first embodiment.

Next, the optical function of the imaging optical system LB which is comprised of first and second imaging lenses 6 and 8 in the present embodiment, will be explained.

In the present embodiment, the first and second imaging lenses 6 and 8 are made of resin (plastic).

The imaging optical system LB functions to image the light beam scanningly deflected by the optical deflector 5 and forms a beam spot on the scan surface 11, to scan the scan surface 11 at a constant speed.

An imaging lens made of resin can be produced by a known molding technique of filling a die with resin and removing it out of the die after cooling.

In this way, the imaging lens can be produced more easily as compared with a conventional imaging lens based on a glass lens.

As shown in Table 2, the first imaging lens 6 having a power mainly in the main-scan direction has an aspherical surface shape having a lens form being expressed by the function of the equation given above.

The first imaging lens 6 has a larger power in the main-scan direction than its power in the sub-scan direction. Also, it is comprised of a lens (meniscus lens) having a non-arcuate shape in the main-scan section and having a concave surface facing toward the optical deflector 5 side.

Furthermore, the shape of the first imaging lens 6 in the main-scan section is symmetric with respect to the optical axis.

Furthermore, although with respect to the sub-scan direction the light entrance surface and the light exit surface have the same curvature and have no power, the lens may have a cylindrical shape, for example, having both surfaces being flat in the sub-scan direction.

This lens provides an imaging function mainly in the main-scan direction, to the light beam incident thereon.

On the other hand, the second imaging lens 8 is an anomorphic lens having a power mainly in the sub-scan direction, as shown in Table 2. The lens form is an aspherical surface shape expressed by a function of the equation given above.

The second imaging lens 8 has a larger power in the sub-scan direction than its power in the main-scan direction. Also, the light entrance surface in the main-scan section has an arcuate shape, while the other surface has a non-arcuate shape.

The shape in the main-scan section is symmetric with respect to the optical axis, and it has no power in the main-scan direction, on the axis.

With regard to the shape in the sub-scan section, the light entrance surface is a flat surface having a very slow curvature, while the light exit surface has a convex shape in which the curvature changes gradually from the optical axis to the outside the optical axis, and the shape is symmetric with respect to the optical axis.

For the light beam incident thereon, this lens has a function of imaging in the sub-scan direction and a function of slightly correcting the distortion in the main-scan direction.

With regard to the imaging relationship in the sub-scan direction of the imaging optical system LB which is comprised of the first and second imaging lenses 6 and 8, it provides a what can be called a surface tilt correction system in which the deflecting surface 51 and the scan surface 7 are in a conjugate relationship.

It is to be noted that the imaging optical system LB should not always be a function expression as shown in the Table 2, but it may be a known expression.

Furthermore, it may have an asymmetric shape with respect to the optical axis, for further improved imaging performance.

In this embodiment, as shown in FIG. 9, after the scan light beam 14 scanningly deflected by the deflecting surface 51 goes through the first imaging lens 6 and then the second imaging lens 8, it is reflected by the first reflecting mirror 7.

Here, denoted in FIG. 9 at 81 is the central line of the contour of the holding frame (not shown) for the transmission type imaging optical element, and denoted at 82 is the optical axis of the imaging optical system LB.

In this embodiment, within the sub-scan section, the second imaging lens 8 is so disposed that the contour central line 81 of the holding frame of the transmission type imaging optical element is located at a side of the principal ray of the light beam incident on the second imaging lens 8, which side is remote from the reflected light path 15.

Namely, in this embodiment, by shifting the second imaging lens 8 in a direction perpendicular to the scan light beam 14 only by a distance (shift amount) dZ, the interference between the reflected light path 15 and the second imaging lens 8 is avoided.

Based on this avoidance of interference, the reflection angle θ at the first reflecting mirror 7 can be made small, and this contributes to the reduction in height of the device in the sub-scan direction.

It should be noted that, as shown in Table 2, the curvature radius r of the second imaging lens 8 in the sub-scan direction is 1000, and this lens is so designed that the optical axis 82 connecting the vertexes does not coincide with the contour central line 81.

In the present embodiment, as shown in Table 2, the angle θ defined between the normal to the first reflecting mirror 7 as a reflection type optical element and the principal ray of the scan light beam 14 is:

θ=7.1 degrees

This satisfies the conditional expression (3) as well as the conditional expression (4).

Furthermore, in this embodiment, the height H of the contour of the holding frame of the transmission type imaging optical element which holds the second imaging lens 8 and the distance dZ from the contour central line 81 to the principal ray of the incident light beam (scan light beam) 14 are: H=12.0 and dZ=1.7. Thus, dZ/H=0.142.

This satisfies the conditional expression (5) as well as the conditional expression (6).

In the present embodiment, as can be seen from FIG. 9, the height of the device in the sub-scan direction can be reduced by making the angle θ small.

Here, the second imaging lens 8 should be shifted in a direction perpendicular to the scan light beam 14 to avoid interference between the reflected light path 15 and the second imaging lens 8.

Although the height reduction effect can be enhanced if the shift amount dZ is made larger, the largest possible shift amount is ½ of the lens height H, and this determines the upper limit of the conditional expression (5).

Furthermore, in a resin lens which is molded by a die, if the lens height is made low as compared with the lens thickness in the optical axis direction, during the cooling process just after the lens is disengaged from the mold, cooling occurs and progresses from the upper and lower portions of the lens.

As a result of this, a refractive index distribution and a birefringence distribution are easily created inside the lens, within the sub-scan section (lens height direction).

It is known that this influence becomes more remarkable as the distance from the central axis of the lens contour becomes larger and that the imaging performance degrades steeply from around two-thirds (⅔) of the span from the contour center to the outer peripheral edge.

Therefore, if the imaging performance of the device is a priority, the ratio should preferably satisfy dZ/H<0.3.

The upper limit of the conditional expression (6) specifies this.

The lower limit of the conditional expressions (5) and (6) defines the lower limit of the shift amount of the second imaging lens 8.

If the shift amount is small, the effect of interference prevention of the interference between the reflected light path 15 and the second imaging lens 8 become insufficient, and the interference would occur if the position of the reflected light path 15 or the position of the second imaging lens 8 varies because of the tolerance at the time of the assembly.

In this embodiment, the second imaging lens 8 having a power in the sub-scan direction is so configured that the contour central line 81 and the optical axis 82 are mutually shifted by a physical distance dZ, while the principal ray of the scan light beam 14 and the optical axis 82 coincide with each other.

With this arrangement, the interference between the reflected light path 15 and the second imaging lens 8 is prevented while, on the other hand, by making the principal ray of the scan light beam 14 and the optical axis 82 coincident with each other, aberration deterioration and occurrence of scan line curve are suppressed.

It should be noted that the concept of any one of the second to sixth embodiments may be incorporated into the second imaging lens 8 of the present embodiment.

Furthermore, although the reflecting mirror as a reflection type optical element used in the first to sixth embodiments is a plane mirror having no power, it may be a curved surface mirror.

A curved surface mirror which is a reflecting mirror may have a power either in the main-scan direction or in the sub-scan direction.

Embodiment of Image Forming Apparatus

Figure 10:
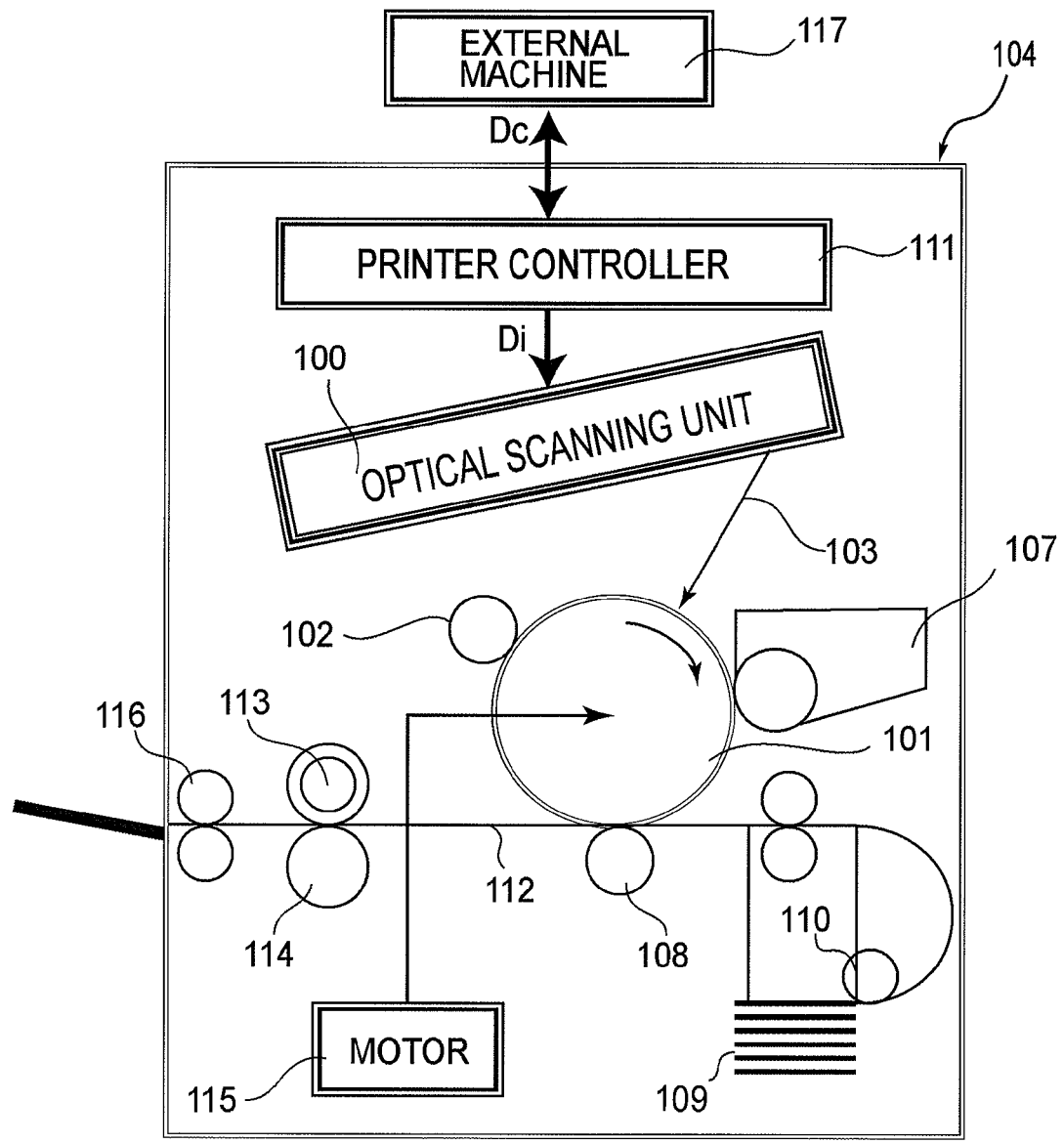
FIG. 10 is a sectional view of a main portion of an image forming apparatus according to the present invention.

FIG. 10 is a schematic and sectional view, in the sub-scan direction, of a main portion of an image forming apparatus according to an embodiment of the present invention. Denoted generally at 104 in the drawing is the image forming apparatus.

The image forming apparatus 104 receives code data Dc supplied thereto from an external machine 117 such as a personal computer, for example. The code data Dc is then transformed by a printer controller 111 inside the apparatus, into imagewise data (dot data) Di.

The imagewise data Di is then inputted into an optical scanning unit (optical scanning device) 100 which is configured in accordance with any one of the preceding embodiments described hereinbefore. The optical scanning unit 100 produces a light beam 103 having been modulated in accordance with the imagewise data Di, and with this light beam 103, the photosensitive surface of a photosensitive drum 101 is scanned in the main-scan direction.

The photosensitive drum 101 which is an electrostatic latent image bearing member (photosensitive member) is rotated clockwise by means of a motor 115. Through this rotation, the photosensitive surface of the photosensitive drum 101 is moved relatively to the light beam 103, in the sub-scan direction which is orthogonal to the main-scan direction.

Disposed just above the photosensitive drum 101 is a charging roller 102 which is in contact with the photosensitive drum surface to electrically charge the drum surface uniformly. Onto the photosensitive drum 101 surface having been electrically charged by the charging roller 102, the light beam 103 being scanned by the optical scanning unit 100 is projected.

As described above, the light beam 103 has been modulated in accordance with the imagewise data Di. By irradiating the photosensitive drum 101 with this light beam 103, an electrostatic latent image is formed on the photosensitive drum 101 surface. The electrostatic latent image thus formed is then developed into a toner image, by means of a developing device 107 which is provided at a position downstream of the irradiation position of the light beam 103 with respect to the rotational direction of the photosensitive drum 101 and which is in contact with the photosensitive drum 101.

The toner image thus developed by the developing device 107 is transferred onto a transfer sheet (transfer material) 112 below the photosensitive drum 101, by means of a transfer roller 108 which is disposed opposed to the photosensitive drum 101.

Transfer sheets 112 are stored in a sheet cassette 109 in front of (at the right-hand side as viewed in FIG. 10) the photosensitive drum, but these can be supplied manually. There is a sheet supplying roller 110 at an end portion of the sheet cassette 109, for supplying each sheet 112 in the cassette 109 into a sheet supply path.

The paper sheet 112 having an unfixed toner image transferred thereto in the manner described above is conveyed to a fixing device behind (at the left-hand side as viewed in FIG. 10) the photosensitive drum 101. The fixing device comprises a fixing roller 113 having a built-in fixing heater (not shown) and a pressing roller 114 disposed to be press-contacted to the fixing roller 113. The transfer sheet 112 supplied from the image transfer station is heated under pressure at the press contact area between the fixing roller 113 and the pressing roller 114, whereby the unfixed toner image on the transfer sheet 112 is fixed thereon.

Behind the fixing roller 113, there are sheet discharging rollers 116 which function to discharge the image-fixed sheet 112 out of the image forming apparatus.

While not shown in FIG. 10, the print controller 111 has various functions in addition to the data conversion function described hereinbefore, such as for controlling a motor 115 or any other components inside the image forming apparatus as well as a polygon motor inside the optical scanning unit (to be described later).

There is no particular limitation with regard to the recording density of the image forming apparatus to be used in the present invention. However, since the higher the recording density is, the higher the required image quality is, the structures according to the first and second embodiments of the present invention will be more effective when they are introduced into an image forming apparatus of a resolution 1200 dpi or higher.

Embodiment of Color Image Forming Apparatus

Figure 11:
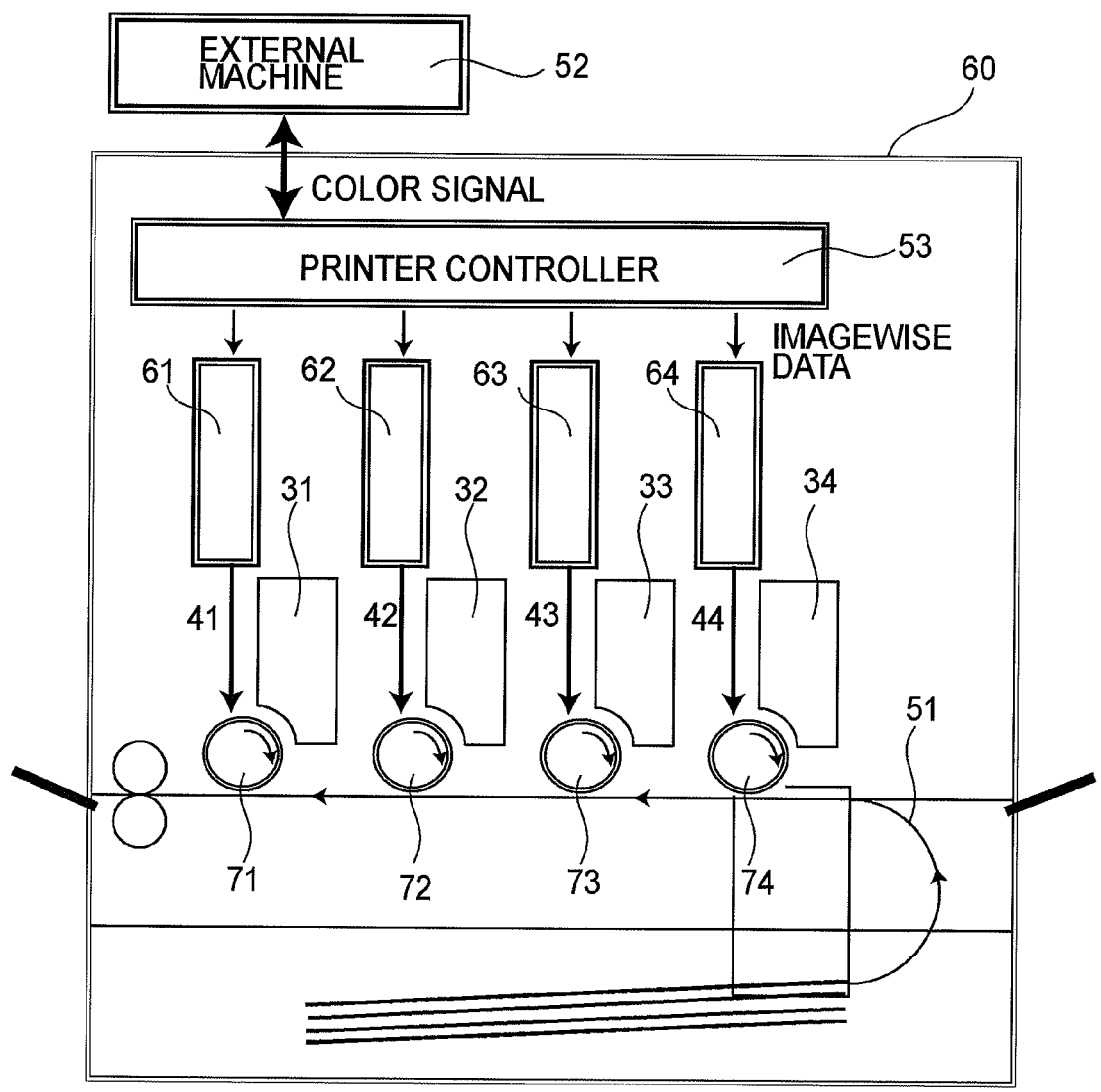
FIG. 11 is a sectional view of a main portion of a color image forming apparatus according to the present invention.
Figure 12:
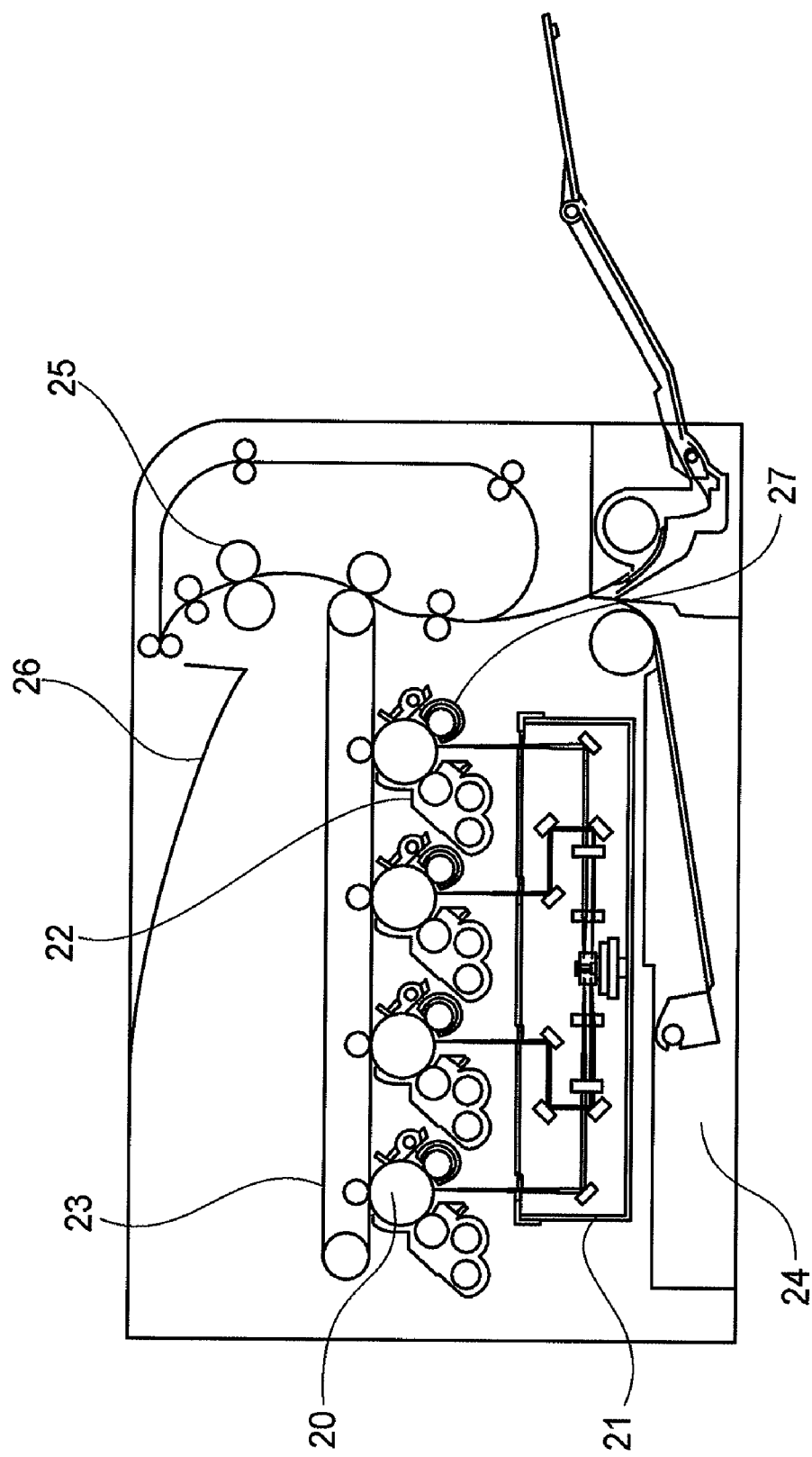
FIG. 12 is a sectional view of a main portion of a conventional image forming apparatus.
Figure 13:
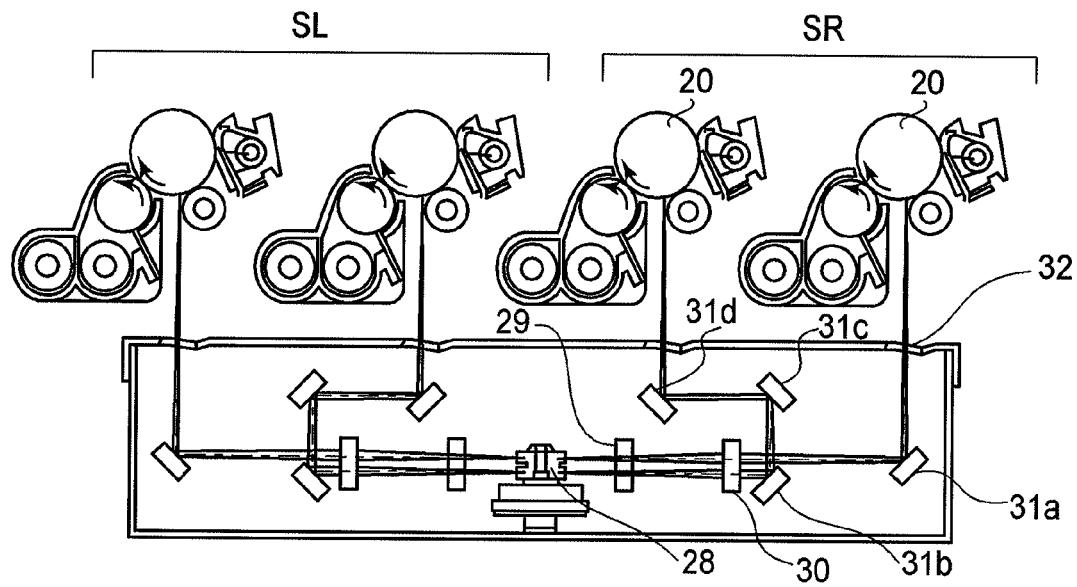
FIG. 13 is a sectional view of a main portion an image forming apparatus as a comparative example.
Figure 14:
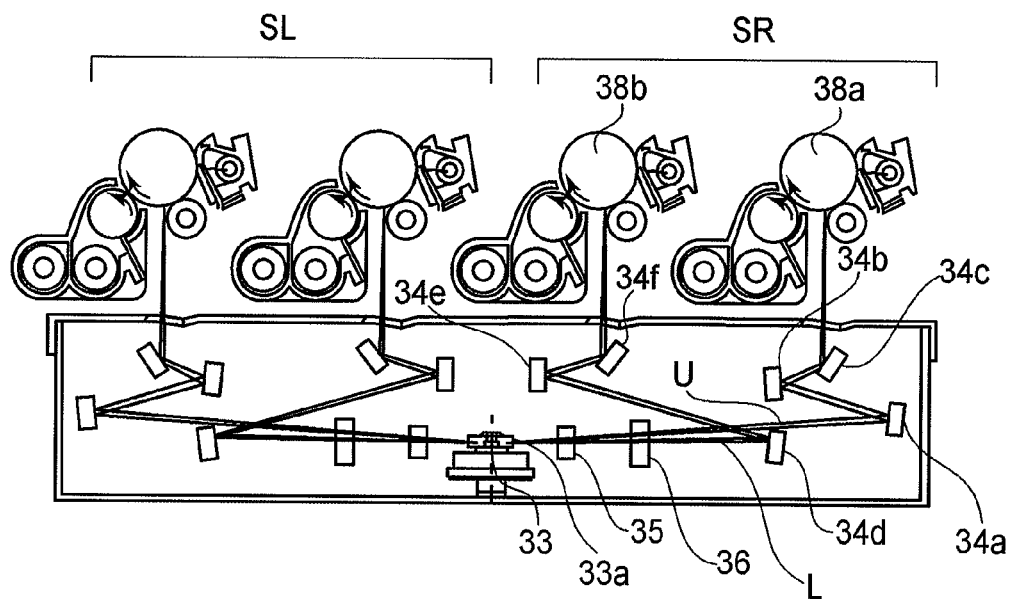
FIG. 14 is a sectional view of a main portion an image forming apparatus as a comparative example.

FIG. 11 is a schematic view of a main portion of a color image forming apparatus according to an embodiment of the present invention. This embodiment is directed to a tandem type color image forming apparatus in which four optical scanning devices are provided so as to record imagewise data upon the surfaces of corresponding photosensitive drums (image bearing members) in parallel to each other.

In FIG. 11, denoted generally at 60 is a color image forming apparatus, and denoted at 61, 62, 63 and 64 are optical scanning devices having a structure according to any one of the preceding embodiments. Denoted at 71, 72, 73 and 74 are photosensitive drums (image bearing members), and denoted at 31, 32, 33 and 34 are developing devices, respectively. Denoted at 51 is a conveyance belt.

Although not shown in FIG. 11, the image forming apparatus further comprises a transfer device for transferring the toner image developed by the developing device to a transfer material, and a fixing device for fixing the transferred toner image on the transfer sheet.

In FIG. 11, the color image forming apparatus 60 receives color signals of R (red), G (green) and B (blue) supplied thereto from an outside machine 52 such as a personal computer, for example. These color signals are transformed by means of a printer controller 53 inside the image forming apparatus, into imagewise data (dot data) corresponding to C (cyan), M (magenta), Y (yellow) and B (black).

These imagewise data are inputted into the optical scanning devices 61, 62, 63 and 64, respectively. In response, these optical scanning devices produce light beams 41, 42, 43 and 44 having been modulated in accordance with the associated imagewise data. Through these light beams, the photosensitive surfaces of the photosensitive drums 71, 72, 73 and 74 are scanned in the main-scan direction.

In the color image forming apparatus of this embodiment, four optical scanning devices 61, 62, 63 and 64 are provided and these correspond to colors of C (cyan), M (magenta), Y (yellow) and B (black), respectively. These scanning devices are operable in parallel to each other to record imagewise signals upon the surfaces of the photosensitive drums 71, 72, 73 and 74, respectively, so that a color image can be printed at high speed.

As described, the color image forming apparatus of this embodiment uses four optical scanning devices 161, 62, 63 and 64 to produce latent images for different colors upon the surfaces of corresponding photosensitive drums 71, 72, 73 and 74, respectively, by use of light beams based on respective image data. After that, these images are superposedly transferred onto a recording sheet, whereby a single full-color image is produced thereon.

As regards the outside machine 52, a color image reading machine having a CCD sensor, for example, may be used. In that occasion, this color image reading machine and the color image forming apparatus 60 will provide a color digital copying machine.

While the invention has been described with reference to the structures disclosed herein, it is not confined to the details set forth and this application is intended to cover such modifications or changes as may come within the purposes of the improvements or the scope of the following claims.

This application claims priority from Japanese Patent Application No. 2007-268779 filed Oct. 16, 2007, for which is hereby incorporated by reference.

What is claimed is:

1. An optical scanning device, comprising:
   an optical deflector configured to scanningly deflect a light beam emitted from light source means; and
   an imaging optical system configured to image the light beam scanningly deflected by a deflecting surface of said optical deflector, upon a scan surface;
   wherein the light beam incident on the deflecting surface of said optical deflector is incident perpendicularly on the deflecting surface, in a sub-scan section,
   wherein the light beam incident on the deflecting surface of said optical deflector is incident with an angle with respect to an optical axis of said imaging optical system, in a main-scan section,
   wherein, along a light path between said optical deflector and the scan surface, there are a transmission type imaging optical element constituting said imaging optical system and a reflection type optical element, which are disposed in this order from said optical deflector,
   wherein, when in the sub-scan section the angle defined between a principal ray of a light beam reflected by said reflection type optical element and a normal to said reflection type optical element is denoted by θ, a condition θ<45 degrees is satisfied, and
   wherein, in the sub-scan section, said transmission type imaging optical element is disposed so that, to avoid interference with a light path reflected by said reflection type optical element, a contour central line of said transmission type imaging optical element is positioned at one side of a principal ray of the light beam incident on said transmission type imaging optical element which side is remote from the light path reflected by said reflection type optical element.

2. An optical scanning device according to claim 1, wherein, when in the sub-scan section the angle defined between the principal ray of the light beam reflected by said reflection type optical element and the normal to said reflection type optical element is denoted by θ, a condition θ<30 degrees is satisfied.

3. An optical scanning device according to claim 1, wherein, when the power of said transmission type imaging optical element in the sub-scan section is denoted by $\phi_i$, and the power of said imaging optical system in the sub-scan section is denoted by $\phi_{all}$, a condition $|\phi_i/\phi_{all}| \leq 0.01$ is satisfied.

4. An optical scanning device according to claim 1, wherein, when the curvature radius in the sub-scan direction of a light entrance surface of said transmission type imaging optical element is denoted by R1 (mm) and the curvature radius in the sub-scan direction of a light exit surface of said transmission type imaging optical element is denoted by R2 (mm), a condition $|1/R1|+|1/R2|<0.0067(1/mm)$ is satisfied.

5. An optical scanning device according to claim 1, wherein, in the sub-scan section, the optical axis of said transmission type imaging optical element does not coincide with a contour central line of said transmission type imaging optical element, and wherein, in the sub-scan section, the principal ray of the light beam incident on said transmission type imaging optical element passes through the optical axis of said transmission type imaging optical element.

6. An optical scanning device according to claim 1, wherein said transmission type imaging optical element is made of a resin material.

7. An optical scanning device according to claim 1, wherein, when in the sub-scan section the height of the outer configuration of a holding frame holding said transmission type imaging optical element is denoted by H (mm) and a physical distance from said contour central line to the principal ray of the light beam incident on the light entrance surface of said transmission type imaging optical element is denoted by dZ (mm) a condition 0.05<dZ/H<0.5 is satisfied.

8. An optical scanning device according to claim 1, wherein said transmission type imaging optical element has a reference surface for the positioning inside the main-scan section, which reference surface is disposed outside an effective region of an optical surface of said transmission type imaging optical element.

9. An optical scanning device according to claim 1, wherein said transmission type imaging optical element has a reference protrusion for determining a reference position in the main-scan section, which protrusion is provided at the light entrance surface side of said transmission type imaging optical element.

10. An optical scanning device according to claim 1, wherein, in the sub-scan section, said transmission type imaging optical element has a reference member of concave shape for determining a reference position in the main-scan section, which reference member is provided at an outer circumferential portion of said transmission type imaging optical element in the sub-scan direction.

11. An optical scanning device according to claim 1, wherein, in the sub-scan section, an end face at an outer circumferential portion of a holding frame in the sub-scan direction for holding said transmission type imaging optical element has a tapered shape along a light path reflected by said reflection type optical element.

12. An optical scanning device, comprising:
   two imaging optical systems as recited in claim 1 and disposed in the sub-scan section to sandwich said optical deflector.

13. An image forming apparatus, comprising:
an optical scanning device as recited in claim 1;
a photosensitive member disposed at said scan surface;
a developing device configured to develop an electrostatic latent image formed on said photosensitive member by a light beam scanned by said optical scanning device, into a toner image;
a transfer device configured to transfer the developed toner image onto a transfer material; and
a fixing device configured to fix the transferred toner image on the transfer material.

14. An image forming apparatus, comprising:
an optical scanning device as recited in claim 1; and
a printer controller configured to convert coded data inputted thereinto from an external instrument, into an imagewise signal and to input the imagewise signal into said optical scanning device.

\* \* \* \* \*